United States Patent
Ogawara

(10) Patent No.: US 10,609,259 B2
(45) Date of Patent: Mar. 31, 2020

(54) IMAGE DISPLAYING SYSTEM, COMMUNICATION SYSTEM, AND METHOD FOR IMAGE DISPLAYING

(71) Applicant: Osamu Ogawara, Kanagawa (JP)

(72) Inventor: Osamu Ogawara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 15/727,101

(22) Filed: Oct. 6, 2017

(65) Prior Publication Data

US 2018/0139361 A1    May 17, 2018

(30) Foreign Application Priority Data

Nov. 16, 2016   (JP) .................. 2016-222968

(51) Int. Cl.
| | | |
|---|---|---|
| *H04L 12/00* | (2006.01) | |
| *G06F 17/30* | (2006.01) | |
| *H04N 5/05* | (2006.01) | |
| *H04N 5/232* | (2006.01) | |
| *H04N 7/01* | (2006.01) | |
| *G06T 5/50* | (2006.01) | |
| *H04N 7/18* | (2006.01) | |
| *H04N 5/247* | (2006.01) | |

(52) U.S. Cl.
CPC ............. *H04N 5/05* (2013.01); *G06T 5/50* (2013.01); *H04N 5/23238* (2013.01); *H04N 5/23293* (2013.01); *H04N 5/247* (2013.01); *H04N 7/0127* (2013.01); *H04N 7/18* (2013.01)

(58) Field of Classification Search
CPC ............ H04N 5/247; H04N 7/18; H04N 5/05; H04N 5/23238; H04N 7/0127; H04N 5/23293; G06T 5/50

USPC ........ 709/216, 248; 707/610, 611, 612, 613, 707/614, 617, 618, 656–657

See application file for complete search history.

(56) References Cited

U.S. PATENT DOCUMENTS

| | | | | |
|---|---|---|---|---|
| 4,879,603 A | * | 11/1989 | Berman ................. | H04N 5/445 348/832 |
| 5,111,409 A | * | 5/1992 | Gasper ................... | A63F 13/10 715/203 |
| 6,173,317 B1 | * | 1/2001 | Chaddha ................ | H04L 29/06 709/219 |
| 7,868,848 B2 | * | 1/2011 | Dai ....................... | G06F 3/1438 345/1.1 |
| 2002/0109697 A1 | * | 8/2002 | Gardiner ............... | G09G 5/399 345/539 |
| 2011/0102445 A1 | * | 5/2011 | Harada ................. | G06F 3/1423 345/536 |

(Continued)

FOREIGN PATENT DOCUMENTS

JP        2014-127001        7/2014

*Primary Examiner* — Frantz Coby
(74) *Attorney, Agent, or Firm* — Oblon, McClelland, Maier & Neustadt, L.L.P.

(57) ABSTRACT

An image display system includes a display and a processor. The processor is configured to: synchronize a first relative position of a first area in an area of a first panorama image and a second relative position of a second area in an area of a second panorama image, and display at least the first area in the first panorama image and at least the second area in the second panorama image on the display. The processor is further configured to change the first area displayed which is displayed in response to change the second area.

16 Claims, 30 Drawing Sheets

(56) References Cited

U.S. PATENT DOCUMENTS

| | | | |
|---|---|---|---|
| 2011/0138282 A1* | 6/2011 | Lai | G06F 17/241 |
| | | | 715/716 |
| 2011/0285905 A1* | 11/2011 | Muikaichi | H04N 13/341 |
| | | | 348/464 |
| 2013/0194399 A1* | 8/2013 | Wirtz | H04N 13/341 |
| | | | 348/53 |
| 2015/0070247 A1* | 3/2015 | Kasahara | H04N 21/4222 |
| | | | 345/1.1 |
| 2017/0052752 A1 | 2/2017 | Ogawara | |

\* cited by examiner

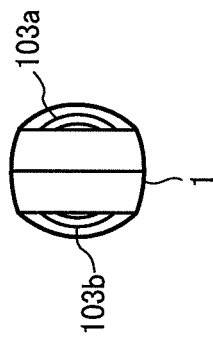
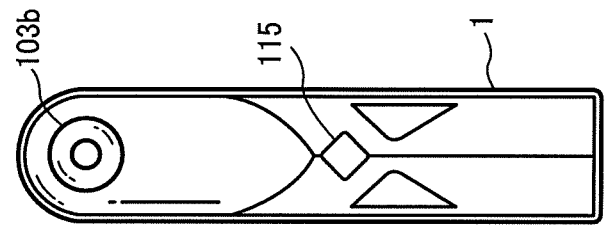
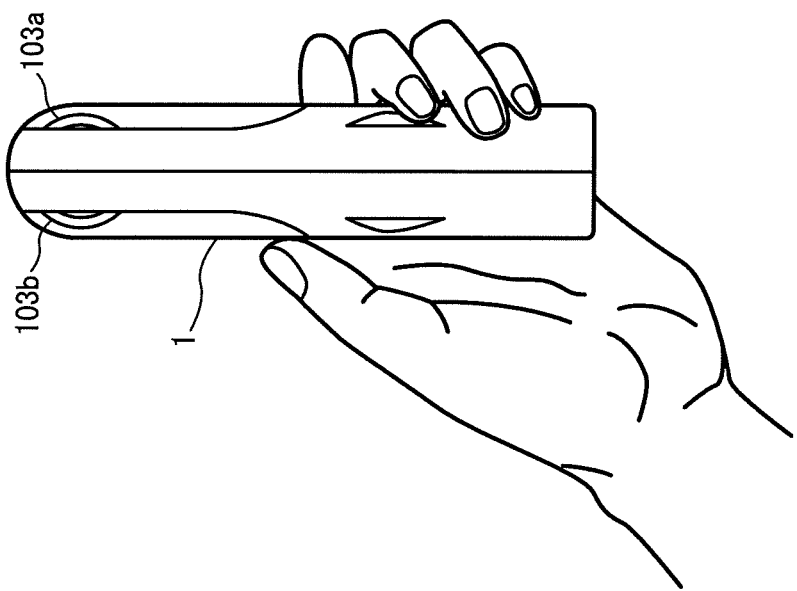

FIG. 3A
FIG. 3B
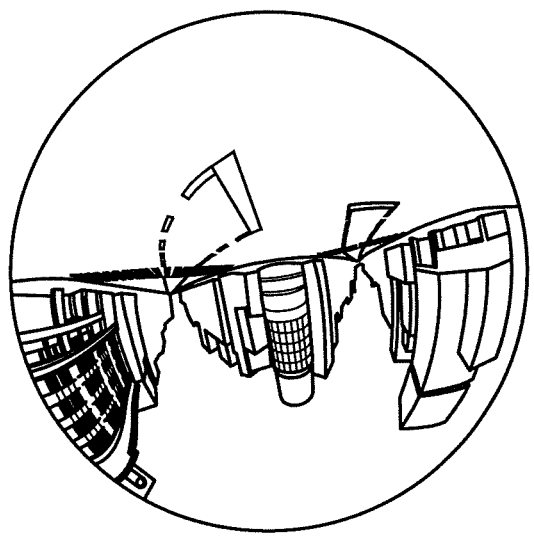
FIG. 3C
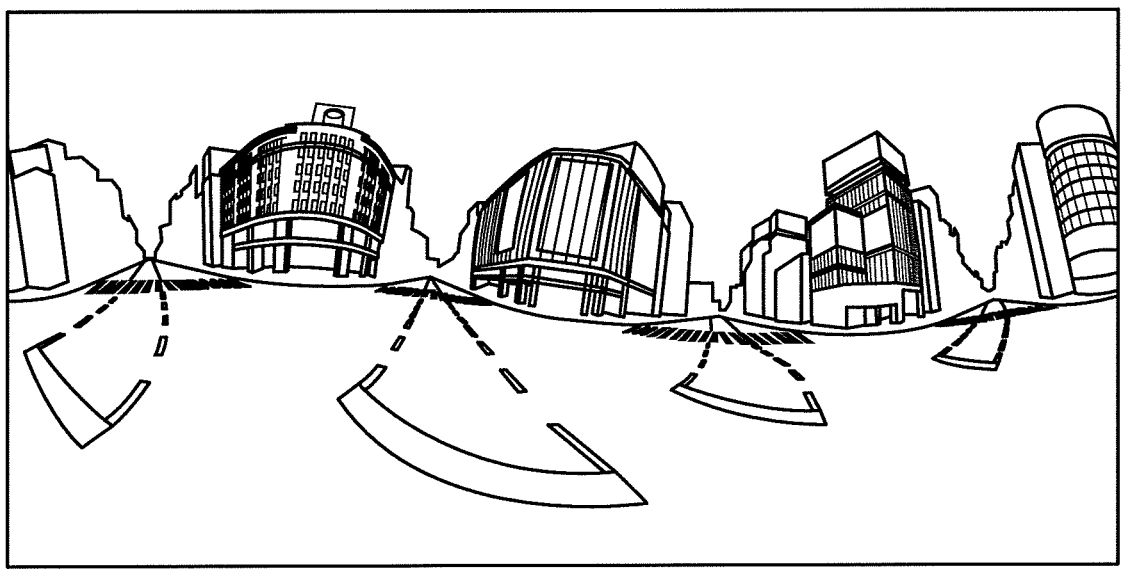

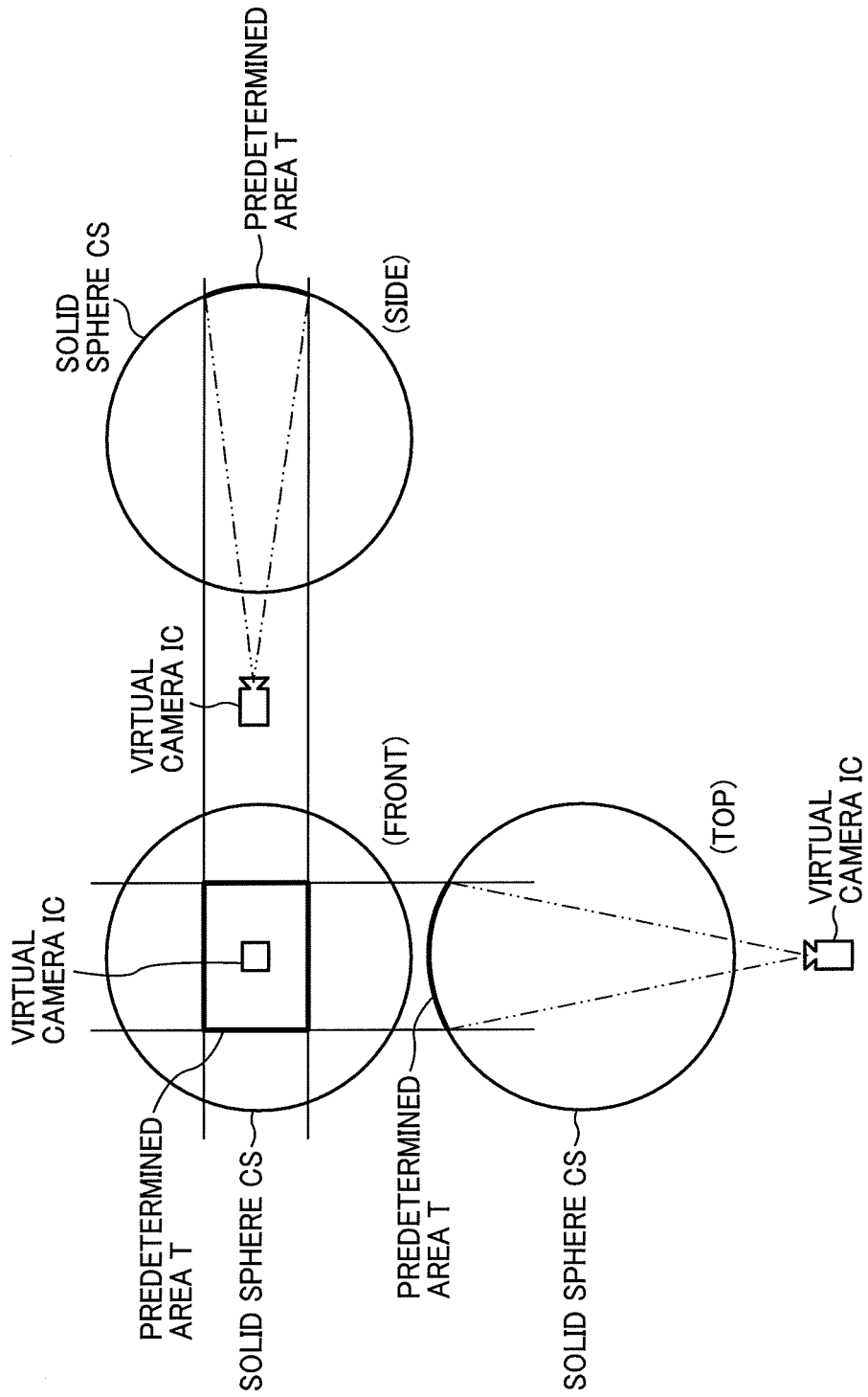

FIG. 14A

IMAGE MANAGEMENT TABLE

| DEVICE ID | IMAGE URL | CAPTURED TIME | SITE NAME | CAPTURED LOCATION | PREDETERMINE-AREA T0 [x (rH), y (rV), α (angle)] |
|---|---|---|---|---|---|
| t0001 | http://example.co/i11.mp4 | 2013.1.1.10:00 | PROPERTY A | LIVING ROOM | rH0, rV0, angle30 |
| t0001 | http://example.co/i12.jpg | 2013.1.1.10:10 | PROPERTY A | ENTRANCE | rH0, rV0, angle30 |
| t0001 | http://example.co/i13.jpg | 2013.1.1.10:15 | PROPERTY A | BEDROOM | rH0, rV0, angle30 |
| t0001 | http://example.co/i21.mp4 | 2016.7.7.10:00 | PROPERTY A | LIVING ROOM | rH0, rV0, angle30 |
| t0001 | http://example.co/i22.jpg | 2016.7.7.10:10 | PROPERTY A | ENTRANCE | rH0, rV0, angle30 |
| t0001 | http://example.co/i23.jpg | 2016.7.7.10:15 | PROPERTY A | BEDROOM | rH0, rV0, angle30 |
| .. | .. | .. | .. | .. | .. |

FIG. 14B

DISPLAYING IMAGE MANAGEMENT TABLE

| IMAGE ID | SITE NAME | CAPTURED LOCATION | CAPTURED TIME | PREDETERMINE-AREA T0 [x (rH), y (rV), α (angle)] | PREDETERMINE-AREA Tc [x (rH), y (rV), α (angle)] | REPRODUCTION TIME |
|---|---|---|---|---|---|---|
| i11 | PROPERTY A | LIVING ROOM | 2013.1.1.10:00 | rH0, rV0, angle30 | rH0, rV0, angle30 | 00:00 |

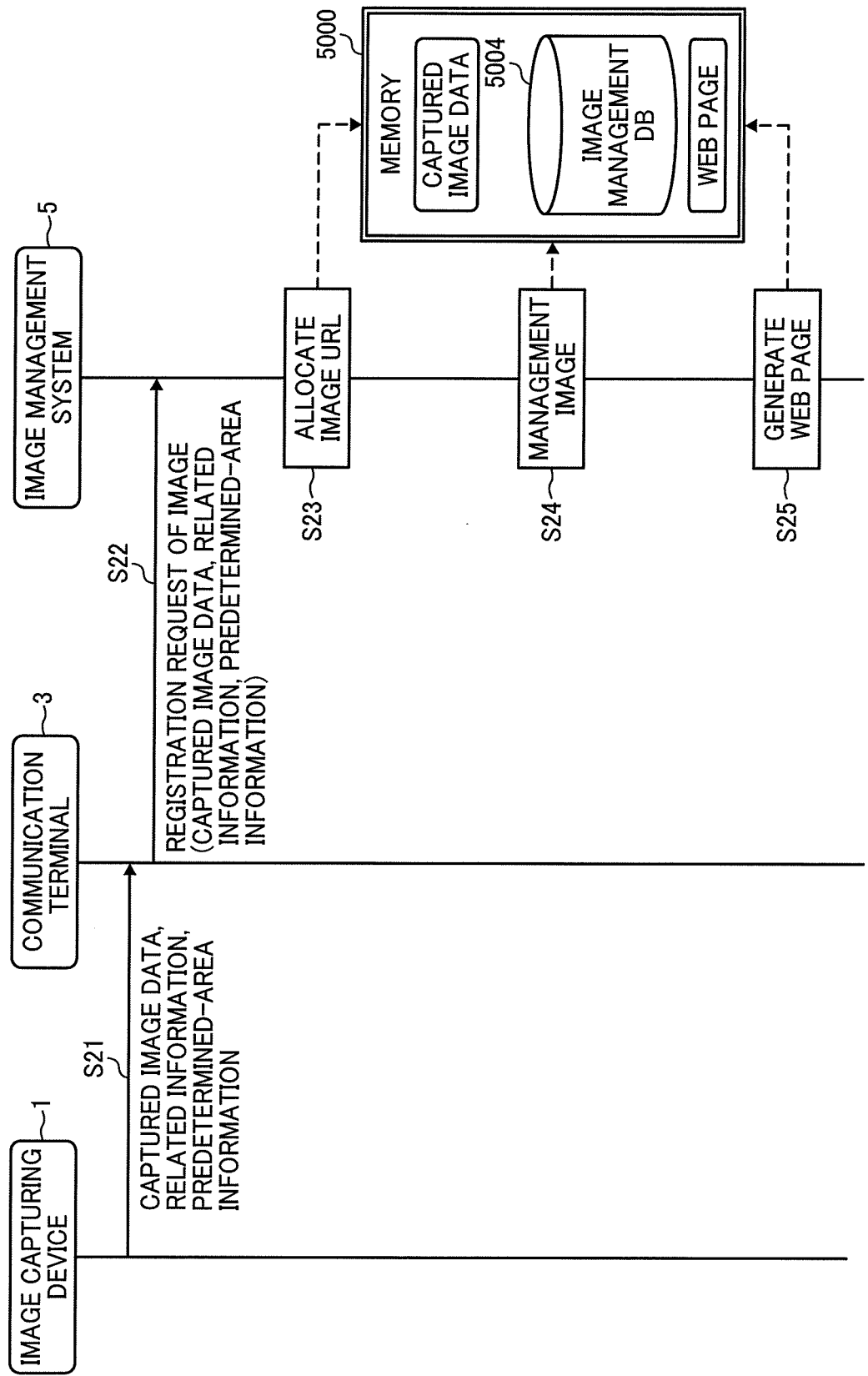

FIG. 29
TABLE 1

| IMAGE ID | SITE NAME | CAPTURED LOCATION | CAPTURED TIME | PREDETERMINE-AREA T0 [x(rH), y(rV), α(angle)] | PREDETERMINE-AREA Tc [x(rH), y(rV), α(angle)] | REPRODUCTION TIME |
|---|---|---|---|---|---|---|
| i11 | PROPERTY A | LIVING ROOM | 2013.1.1.10:00 | rH0, rV0, angle30 | rH0, rV0, angle45 | 00:00 |

FIG. 30
TABLE 2

| IMAGE ID | SITE NAME | CAPTURED LOCATION | CAPTURED TIME | PREDETERMINE-AREA T0 [x(rH), y(rV), α(angle)] | PREDETERMINE-AREA Tc [x(rH), y(rV), α(angle)] | REPRODUCTION TIME |
|---|---|---|---|---|---|---|
| i11 | PROPERTY A | LIVING ROOM | 2013.1.1.10:00 | rH0, rV0, angle30 | rH0, rV0, angle45 | 00:00 |
| i21 | PROPERTY A | LIVING ROOM | 2016.7.7.10:00 | rH0, rV0, angle30 | | |

FIG. 31
TABLE 3

| IMAGE ID | SITE NAME | CAPTURED LOCATION | CAPTURED TIME | PREDETERMINE-AREA T0 [x(rH), y(rV), α(angle)] | PREDETERMINE-AREA Tc [x(rH), y(rV), α(angle)] | REPRODUCTION TIME |
|---|---|---|---|---|---|---|
| i11 | PROPERTY A | LIVING ROOM | 2013.1.1.10:00 | rH0, rV0, angle30 | rH0, rV0, angle45 | 00:00 |
| i21 | PROPERTY A | LIVING ROOM | 2016.7.7.10:00 | rH0, rV0, angle30 | rH0, rV0, angle45 | 00:00 |

FIG. 32
TABLE 4

| IMAGE ID | SITE NAME | CAPTURED LOCATION | CAPTURED TIME | PREDETERMINE-AREA T0 [x(rH), y(rV), α(angle)] | PREDETERMINE-AREA Tc [x(rH), y(rV), α(angle)] | REPRODUCTION TIME |
|---|---|---|---|---|---|---|
| i11 | PROPERTY A | LIVING ROOM | 2013.1.1.10:00 | rH0, rV0, angle30 | rH180, rV0, angle45 | 00:00 |
| i21 | PROPERTY A | LIVING ROOM | 2016.7.7.10:00 | rH0, rV0, angle30 | rH180, rV0, angle45 | 00:00 |

__US 10,609,259 B2__

IMAGE DISPLAYING SYSTEM, COMMUNICATION SYSTEM, AND METHOD FOR IMAGE DISPLAYING

CROSS-REFERENCE TO RELATED APPLICATION

This patent application is based on and claims priority pursuant to 35 U.S.C. § 119(a) to Japanese Patent Application No. 2016-222968, filed on Nov. 16, 2016, the entire disclosure of which is hereby incorporated by reference herein. This application is also related to U.S. patent application Ser. No. 15/404,616 filed Jan. 12, 2017, which is incorporated herein by reference.

BACKGROUND

Technical Field

The present disclosure relates to an image displaying system, an communication system, and method for image displaying.

Description of the Related Art

Digital cameras that obtain panoramic images with one shot exist. The photographed panoramic image is uploaded from a photographing apparatus to a management system such as SNS (Social Networking Service) via a communication terminal such as a smartphone. The other communication terminal can access the management system and download the panoramic image. However, since the panorama image displayed on the communication terminal seems to be curved, sometimes it is not possible to grasp what the displayed panorama image is.

Therefore, a part of the panoramic image is displayed on the communication terminal. For example, by comparing a plurality of images obtained by photographing the same object at different times, the user confirms the difference in daylighting due to the time of the target, the change over time, and the like. However, there arises a problem that when the area to be displayed is changed in a plurality of panorama images photographed at the same position, the same object is not displayed.

SUMMARY

An image display system includes a display and a processor. The processor is configured to synchronize a first relative position of a first area in an area of a first panorama image and a second relative position of a second area in an area of a second panorama image; display at least the first area in the first panorama image and at least the second area in the second panorama image on the display; and change the first area displayed which is displayed in response to change the second area.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A is a left side view of an image capturing device according to an embodiment of the present invention;

FIG. 1B is a front view of the image capturing device of FIG. 1A;

FIG. 1C is a plan view of the image capturing device of FIG. 1A;

FIG. 3A is a view illustrating a front side of a hemispherical image captured by the image capturing device of FIG. 1 according to an embodiment of the present invention;

FIG. 3B is a view illustrating a back side of the hemispherical image captured by the image capturing device of FIG. 1 according to an embodiment of the present invention;

FIG. 3C is a view illustrating an image captured by the image capturing device of FIG. 1, represented by Mercator projection according to an embodiment of the present invention;

FIG. 5 is a view illustrating positions of a virtual camera and a predetermined area in a case in which the full spherical panoramic image is represented as a three-dimensional solid sphere;

FIGS. 14A and 14B are examples of each management table managed by the image management system or communication terminal according to an embodiment of the present invention;

FIG. 15 is a sequence diagram illustrating a process of uploading the image according to an embodiment of the present invention;

FIG. 29 illustrates a sample table used with the invention;

FIG. 30 illustrates a sample table used with the invention;

FIG. 31 illustrates a sample table used with the invention; and

FIG. 32 illustrates a sample table used with the invention.

DETAILED DESCRIPTION

Figure 2:
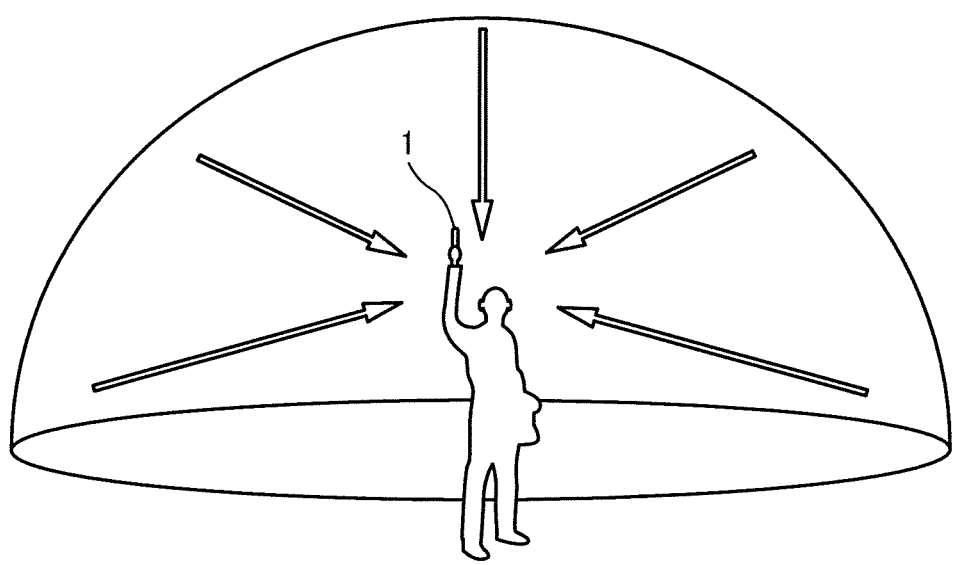
FIG. 2 is an illustration for explaining how a user uses the image capturing device of FIG. 1A to 1C (FIG. 1) according to an embodiment of the present invention.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given hereinafter of generation of a full spherical panoramic image with reference to FIGS. 1 to 7.

First, a description is given of an external view of an image capturing device 1 with reference to FIGS. 1A to 1C. The image capturing device 1 is a digital camera for acquiring captured images from which a 360-degree full spherical panoramic image is generated. FIGS. 1A to 1C are respectively a left side view, a front view, and a plan view of the image capturing device 1.

As illustrated in FIG. 1A, the image capturing device 1 has a shape such that can hold it with one hand. Further, as illustrated in FIGS. 1A to 1C, an imaging element 103a is provided on a front side (anterior side) of an upper section of the image capturing device 1, and an imaging element 103b is provided on a back side (rear side) thereof. Furthermore, as illustrated in FIG. 1B, an operation unit 115 such as a shutter button is provided on the back side (rear side) of the image capturing device 1.

Hereinafter, a description is given of a situation where the image capturing device 1 is used with reference to FIG. 2. FIG. 2 is an example illustration for explaining how a user uses the image capturing device 1. As illustrated in FIG. 2, for example, the image capturing device 1 is used for capturing objects surrounding the user who is holding the image capturing device 1 in his/her hand. The imaging elements 103a and 103b illustrated in FIGS. 1A to 1C capture the objects surrounding the user to obtain two hemispherical images.

Figure 4B:
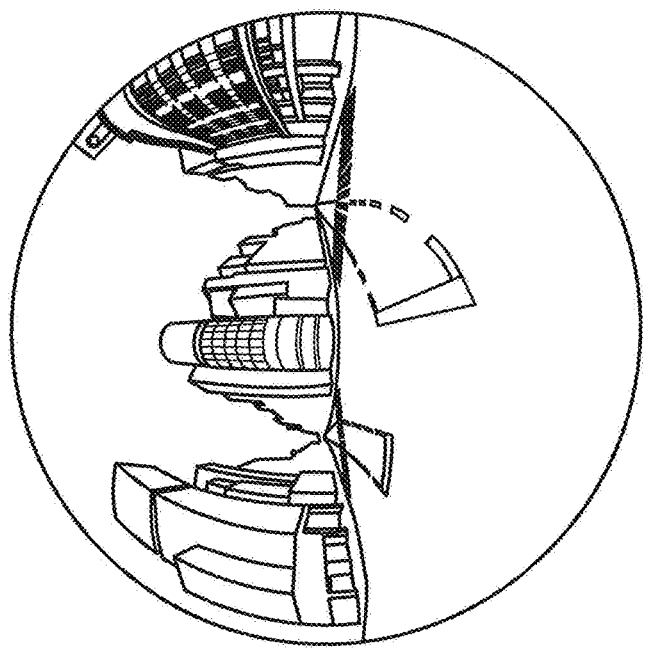
FIG. 4B is a view illustrating a full spherical panoramic image according to an embodiment of the present invention.
Figure 4A:
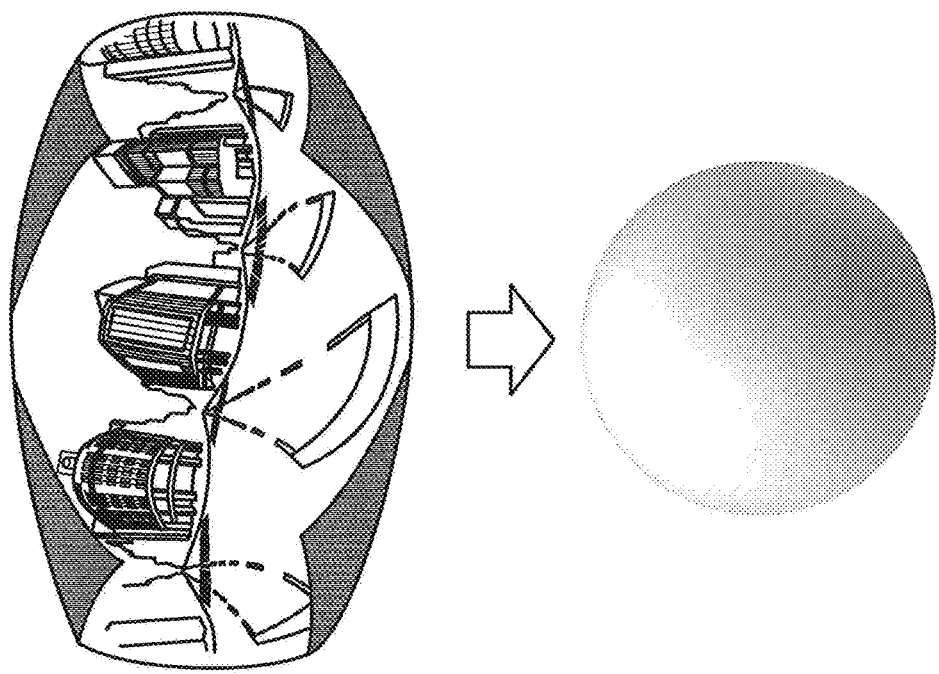
FIG. 4A is an illustration for explaining how the image represented by Mercator projection covers a surface of a sphere according to an embodiment of the present invention.

Hereinafter, a description is given of an overview of an operation of generating the full spherical panoramic image from the image captured by the image capturing device 1. FIG. 3A is a view illustrating a front side of a hemispherical image captured by the image capturing device 1. FIG. 3B is a view illustrating a back side of the hemispherical image captured by the image capturing device 1. FIG. 3C is a view illustrating an image represented by Mercator projection, a well-known manner of representing a spherical image on a flat surface. The image represented by Mercator projection as illustrated in FIG. 3C is referred to as a "Mercator image" hereinafter. FIG. 4A is an illustration of how the Mercator image covers a surface of a sphere. FIG. 4B is a view illustrating the full spherical panoramic image.

Figure 9:
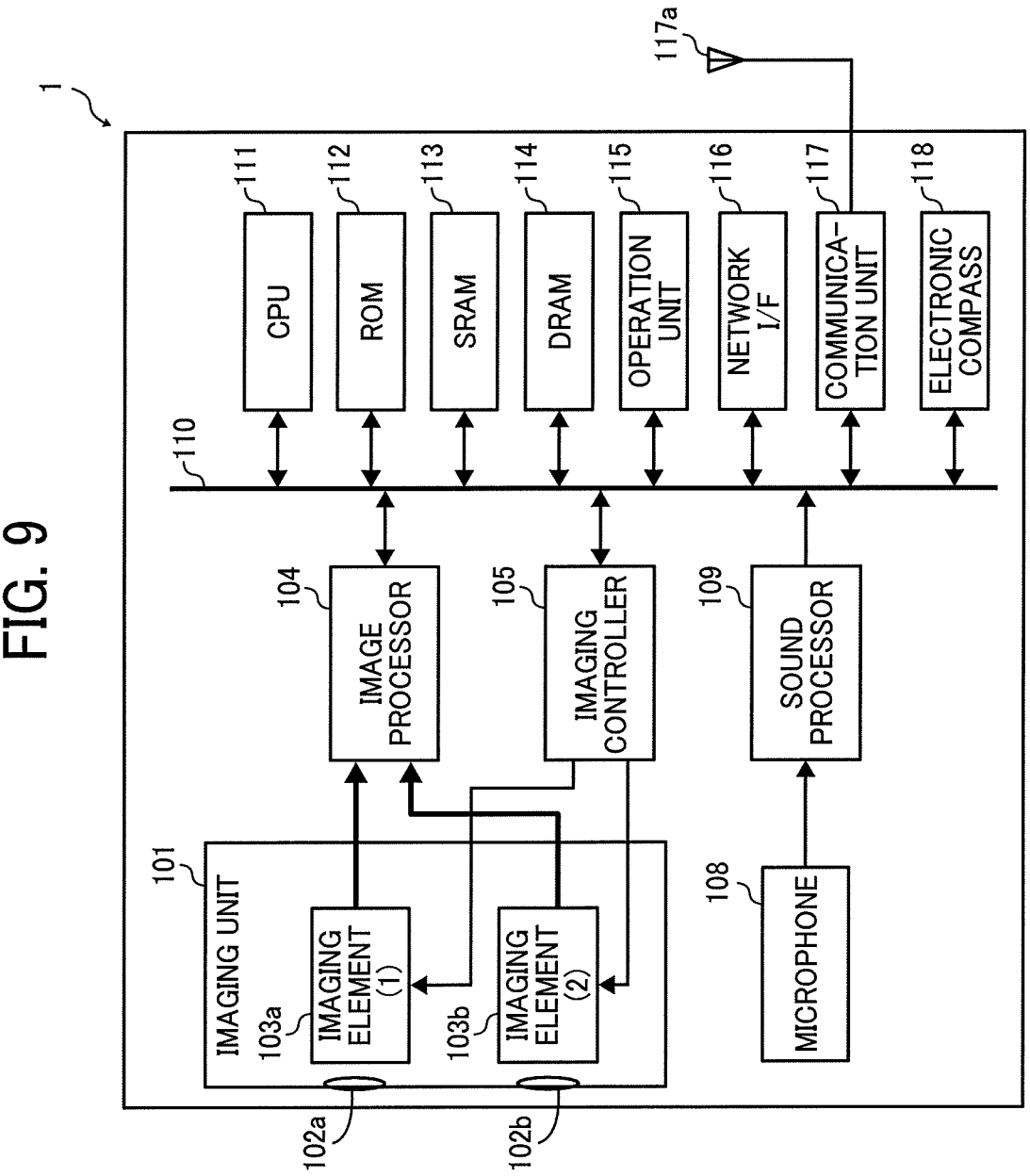
FIG. 9 is a block diagram illustrating a hardware configuration of the image capturing device of FIG. 1 according to an embodiment of the present invention.

As illustrated in FIG. 3A, an image captured by the imaging element 103a is a curved hemispherical image (front side) taken through a fisheye lens 102a (FIG. 9). Also, as illustrated in FIG. 3B, an image captured by the imaging element 103b is a curved hemispherical image (back side) taken through a fisheye lens 102b (FIG. 9). The hemispherical image (front side) and the hemispherical image (back side), which is reversed by 180-degree from each other, is combined. Thus, the Mercator image as illustrated in FIG. 3C is generated.

As illustrated in FIG. 4A, the Mercator image is attached to a sphere surface in such a manner that the sphere surface is covered with the Mercator image using Open Graphics Library for Embedded Systems (OpenGL ES). Thus, the full spherical panoramic image as illustrated in FIG. 4B is generated. In other words, the full spherical panoramic image is represented as the Mercator image facing toward a center of the sphere. It should be noted that OpenGL ES is a graphic library used for visualizing two-dimensional (2D) and three-dimensional (3D) data. The full spherical panoramic image is either a still image or a movie.

One may feel strange viewing the full spherical panoramic image, because the full spherical panoramic image is an image attached to the sphere surface. To resolve this strange feeling, an image of a predetermined area, which is a part of the full spherical panoramic image, is displayed as a planar image having less curves. The image of the predetermined area is referred to as a "predetermined-area image" hereinafter. Hereinafter, a description is given of displaying the predetermined-area image with reference to FIG. 5 and FIGS. 6A and 6B.

Figure 6A:
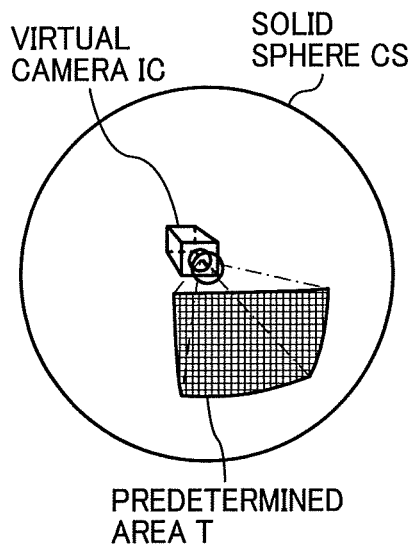
FIG. 6A is a perspective view of FIG. 5.
Figure 6B:
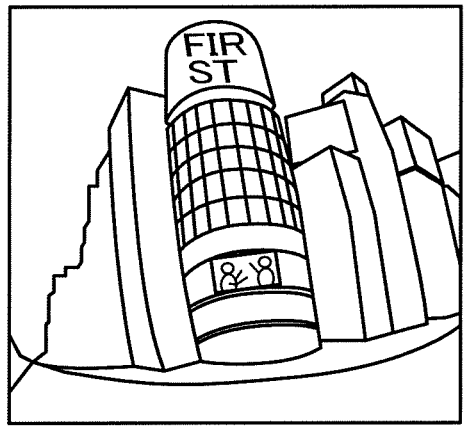
FIG. 6B is a view illustrating an image of the predetermined area on a display of a communication terminal according to an embodiment of the present invention.

FIG. 5 is a view illustrating positions of a virtual camera IC and a predetermined area T in a case in which the full spherical panoramic image is represented as a three-dimensional solid sphere. The virtual camera IC corresponds to a position of a point of view of a user who is viewing the full spherical panoramic image represented as the three-dimensional solid sphere. FIG. 6A is a perspective view of FIG. 5. FIG. 6B is a view illustrating the predetermined-area image displayed on a display. In FIG. 6A, the full spherical panoramic image illustrated in FIG. 4B is illustrated as a three-dimensional solid sphere CS. The predetermined area T in the full spherical panoramic image is specified by predetermined-area information of the position of the virtual camera IC in the full spherical panoramic image. This predetermined-area information is represented by, for example, a coordinate (x (rH), y (rV), and angle of view α (angle)) or a coordinate (X, Y, Z). Zooming of the predetermined area T is implemented by enlarging or reducing a range of the angle of view α. In other words, zooming of the predetermined area T is implemented by enlarging or reducing an arc. Further, zooming of the predetermined area T is implemented by moving the virtual camera IC toward or away from the full spherical panoramic image.

An image of the predetermined area T in the full spherical panoramic image, illustrated in FIG. 6A, is displayed on a display as the predetermined-area image, as illustrated in FIG. 6B. FIG. 6B illustrates an image represented by the predetermined-area information (x, y, α), which is set by default.

Figure 7:
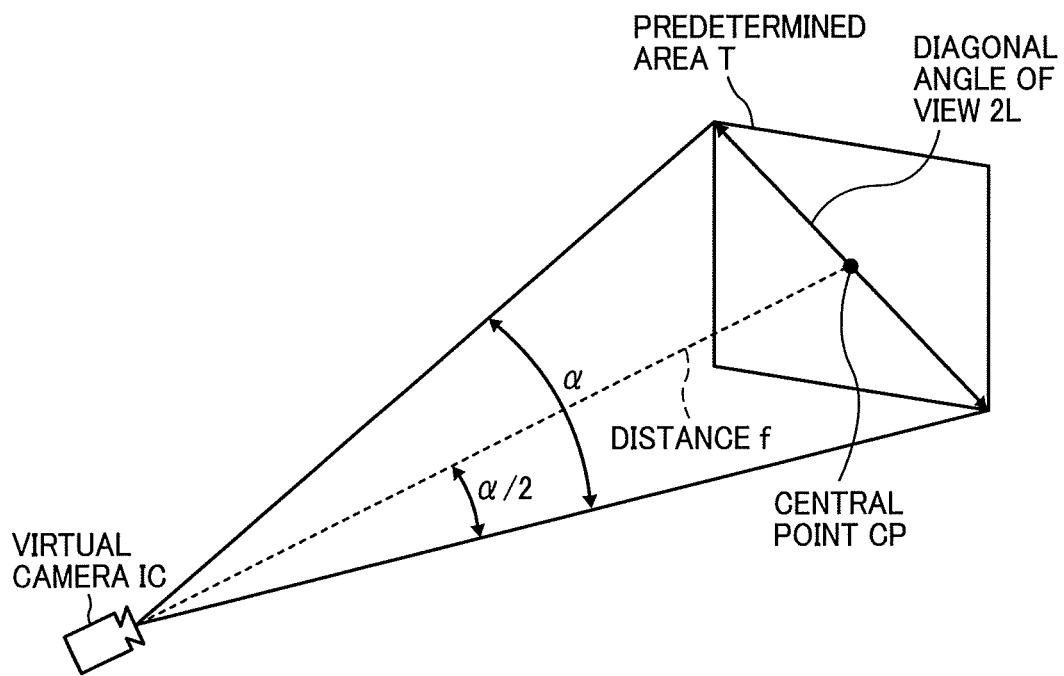
FIG. 7 is a view illustrating a relation between predetermined-area information and a predetermined-area image.

Hereinafter, a description is given of a relation between the predetermined-area information and the predetermined-area image with reference to FIG. 7. As illustrated in FIG. 7, a center point CP of 2L provides the parameters (x, y) of the predetermined-area information, where 2L denotes a diagonal angle of view of the predetermined area T. Distance f denotes a distance from the virtual camera IC to the central point CP. In FIG. 7, a trigonometric function equation generally expressed by the following equation is satisfied.

$$Lf=\tan(\alpha/2)$$

Hereinafter, a description is given of an overview of a configuration of an image communication system according to this embodiment with reference to FIG. 8.

Figure 8:
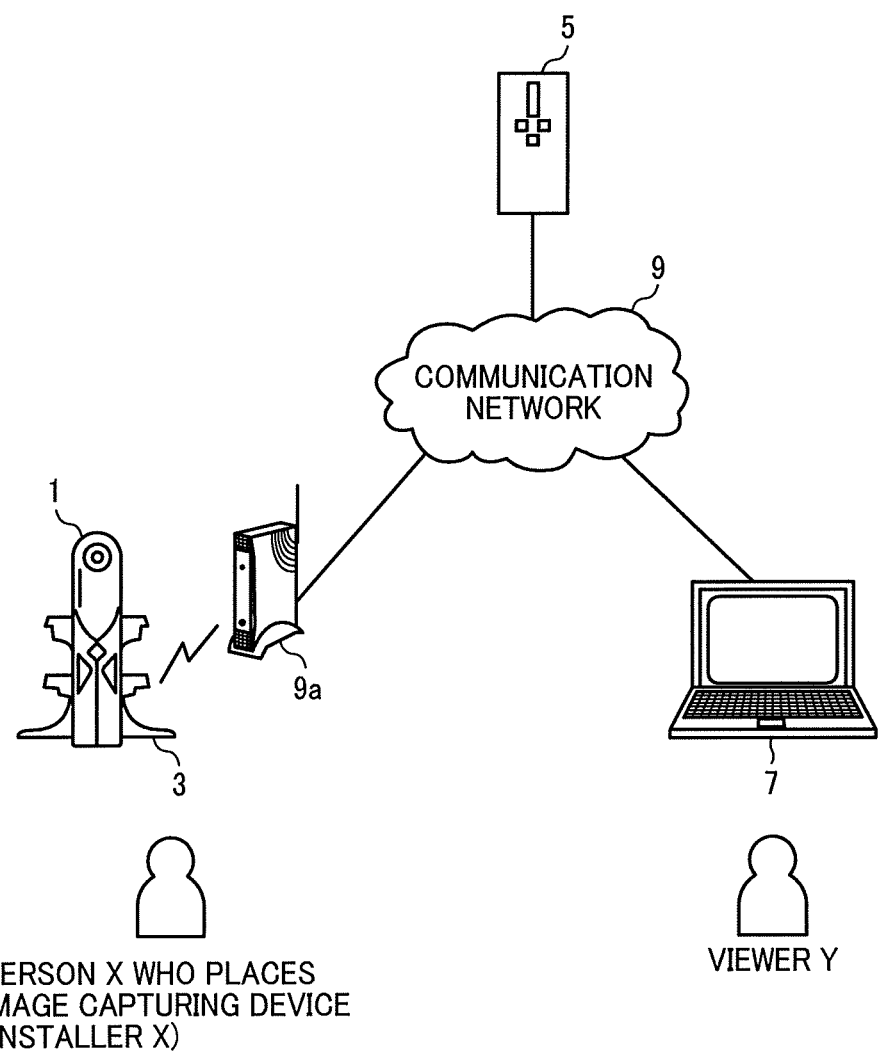
FIG. 8 is a schematic diagram illustrating a configuration of an image communication system including an image management system, a first communication terminal, and a second communication terminal according to an embodiment of the present invention.

As illustrated in FIG. 8, the image communication system includes the image capturing device 1, a communication terminal 3, a wireless router 9a, an image management system 5, and a communication terminal 7.

As described above, the image capturing device 1 is a digital camera capable of obtaining the full spherical panoramic image. Alternatively, the image capturing device 1 may be a typical digital camera. In a case in which the communication terminal 3 includes a camera, the communication terminal 3 may also operate as the digital camera. In this embodiment, a description is given of a case in which the image capturing device 1 is a digital camera that is capable of obtaining the full spherical panoramic image, in order to make the description simple. In this example, the communication terminal 3 operates at least as a docking station that charges the image capturing device 1 or exchanges data with the image capturing device 1. The communication terminal 3 communicates data with the image capturing device 1 via a contact. In addition, the communication terminal 3 communicates data with the image management system 5 via the wireless router 9a and a communication network 9. The communication network 9 is implemented by, for example, the Internet.

The image management system 5 communicates data with the communication terminal 3 and the communication terminal 7 via the communication network 9. The image management system 5 is implemented by, for example, a server computer. The image management system 5 is installed with OpenGL ES to generate the full spherical panoramic image. Further, it should be noted that the image management system 5 may be implemented by either a single server computer or a plurality of server computers.

The communication terminal 7 communicates data with the image management system 5 via the communication network 9. The communication terminal 7 is implemented by, for example, a laptop computer. Further, it should be noted that the communication terminal 7 may be not only the laptop computer, but also desktop computer, smartphone, tablet device, and smart watch.

In this embodiment, the image capturing device 1 is used by installer X, the communication terminal 7 is used by the viewer Y view the captured image. The image management system 5 is at, for example, a service enterprise that provides services such as providing the communication terminal 7 with the captured image data based on the captured-image data transmitted from the communication terminal 3.

Hereinafter, a description is given of hardware configurations of the image capturing device 1, the communication terminal 3, the communication terminal 7, and the image management system 5 according to this embodiment with reference to FIGS. 9 to 11.

First, a description is given of a hardware configuration of the image capturing device 1 with reference to FIG. 9. Although a description is given of a case in which the image capturing device 1 is an omnidirectional image capturing device having two imaging elements, the image capturing device 1 may include three or more imaging elements. In addition, the image capturing device 1 is not necessarily an image capturing device dedicated to omnidirectional image capturing. Alternatively, an external omnidirectional image capturing unit may be attached to a general digital camera or smartphone to implement an image capturing device having a substantially same function as that of the image capturing device 1. The image capturing device may be implemented, for example, using the Ricoh Theta image capturing device.

As illustrated in FIG. 9, the image capturing device 1 includes an imaging unit 101, an image processor 104, an imaging controller 105, a microphone 108, a sound processor 109, a central processing unit (CPU) 111, a read only memory (ROM) 112, a static random access memory (SRAM) 113, a dynamic random access memory (DRAM) 114, an operation unit 115, a network interface (I/F) 116, a communication unit 117, an antenna 117a, and an electronic compass 118.

The imaging unit 101 includes two wide-angle lenses (so-called fish-eye lenses) 102a and 102b, each having an angle of view of equal to or greater than 180 degrees so as to form a hemispheric image. The imaging unit 101 further includes the two imaging elements 103a and 103b corresponding to the wide-angle lenses 102a and 102b respectively. The imaging elements 103a and 103b each includes an image sensor such as a complementary metal oxide semiconductor (CMOS) sensor and a charge-coupled device (CCD) sensor, a timing generation circuit, and a group of registers. The image sensor converts an optical image formed by the wide-angle lenses 102a and 102b into electric signals to output image data. The timing generation circuit generates horizontal or vertical synchronization signals, pixel clocks and the like for the image sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104 and the imaging controller 105 are each connected to the CPU 111 via a bus 110. Furthermore, the ROM 112, the SRAM 113, the DRAM 114, the operation unit 115, the network I/F 116, the communication unit 117, and the electronic compass 118 are also connected to the bus 110.

The image processor 104 acquires the image data from each of the imaging elements 103a and 103b via the parallel I/F bus and performs predetermined processing on each image data. Thereafter, the image processor 104 combines these image data to generate data of the Mercator image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the I2C bus. The imaging controller 105 receives necessary commands and the like from the CPU 111. Further, the imaging controller 105 acquires status data and the like of the group of registers of the imaging elements 103a and 103b via the I2C bus. The imaging controller 105 sends the acquired status data and the like to the CPU 111.

The imaging controller 105 instructs the imaging elements 103a and 103b to output the image data at a time when the shutter button of the operation unit 115 is pressed. The image capturing device 1 may have a preview function or support displaying movie. In this case, the image data are continuously output from the imaging elements 103a and 103b at a predetermined frame rate (frames per minute).

Furthermore, the imaging controller 105 operates in cooperation with the CPU 111 to synchronize times when the imaging elements 103a and 103b output the image data. It should be noted that although the image capturing device 1 does not include a display in this embodiment, alternatively the image capturing device 1 may include the display.

The microphone 108 converts sounds to audio data (signal). The sound processor 109 acquires the audio data from the microphone 108 via an I/F bus and performs predetermined processing on the audio data.

The CPU 111 controls an entire operation of the image capturing device 1 and performs necessary processing. The ROM 112 stores various programs for the CPU 111. The SRAM 113 and the DRAM 114 each operates as a work memory to store the program loaded from the ROM 112 for execution by the CPU 111 or data in current processing. More specifically, the DRAM 114 stores the image data currently processed by the image processor 104 and the data of the Mercator image on which processing has been performed. The CPU 111 which is a processor and each of the processors disclosed herein are considered circuitry or processing circuitry, as they include therein circuitry which has been programmed to perform the desired functionality.

The operation unit 115 collectively refers to various operation keys, a power switch, the shutter button, and a touch panel having functions of both displaying information and receiving input from a user, which may be used in combination. The user operates the operation keys to input various photographing modes or photographing conditions.

The network I/F 116 collectively refers to an interface circuit such as an universal serial bus (USB) I/F that allows the image capturing device 1 to communicate data with an external media such as a SD card or an external personal computer. The network I/F 116 supports at least one of wired and wireless communications. The data of the Mercator image, which is stored in the DRAM 114, is stored in the external media via the network I/F 116 or transmitted to the external device such as the communication terminal 3 via the network I/F 116.

The communication unit 117 is implemented by, for example, an interface circuit. The communication unit 117 communicates data with an external device such as the communication terminal 3 via the antenna 117a by a near distance wireless communication such as Wi-Fi and Near Field Communication (NFC). The communication unit 117 is also capable of transmitting the data of Mercator image to the external device such as the communication terminal 3.

The electronic compass 118 calculates an orientation and a tilt (roll angle) of the image capturing device 1 from the Earth's magnetism to output orientation and tilt information. This orientation and tilt information is an example of related information, which is meta data described in compliance with Exif. This information is used for image processing such as image correction of the captured image. Further, the related information also includes a date and time when the image is captured by the image capturing device 1, and a size of the image data.

Hereinafter, a description is given of a hardware configuration of the communication terminal 3 with reference to FIG. 10. FIG. 10 is a block diagram illustrating a hardware configuration of the communication terminal 3, which in this embodiment is implemented by a docking station having a wireless communication capability.

Figure 10:
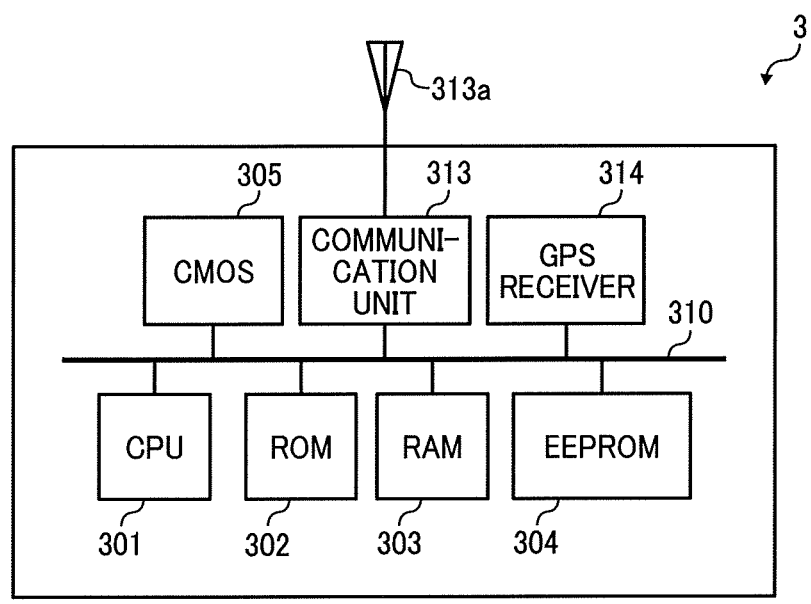
FIG. 10 is a block diagram illustrating a hardware configuration of the first communication terminal of FIG. 8 according to an embodiment of the present invention.

As illustrated in FIG. 10, the communication terminal 3 includes a CPU 301, a ROM 302, a RANI 303, an electrically erasable programmable ROM (EEPROM) 304, and a CMOS sensor 305. The CPU 301 controls entire operation of the communication terminal 3. The ROM 302 stores basic input/output programs. The CPU 301 uses the RAM 302 as a work area when executing programs or processing data. The EEPROM 304 performs data reading and writing under control of the CPU 301. The CMOS sensor 305 is an imaging element that captures an image of an object to obtain image data under control of the CPU 301.

The EEPROM 304 stores an operating system (OS), other programs, and various data for execution by the CPU 301. Instead of the CMOS sensor 305, a CCD sensor may be used.

Further, the communication terminal 3 includes an antenna 313a, a communication unit 313, a global positioning systems (GPS) receiver 314, and a bus line 310. The communication unit 313, which is implemented by, for example, an interface circuit, communicates data with other apparatuses or terminals by wireless communication signals using the antenna 313a. The GPS receiver 314 receives GPS signals containing position information of the communication terminal 3 with GPS satellites or an indoor Messaging system as indoor GPS. This position information of communication terminal 3 is represented by, for example, a latitude, longitude, and altitude. The bus line 310 electrically connects those parts or devices of the communication terminal 3 to each other. Examples of the bus line 310 include an address bus and a data bus.

Hereinafter, a description is given of hardware configurations of the image management system 5 and the communication terminal 7, which in this embodiment is implemented by a laptop computer, with reference to FIG. 11. FIG. 11 is a block diagram illustrating a hardware configuration of any one of the image management system 5 and the communication terminal 7. In this embodiment, both the image management system 5 and the communication terminal 7 are implemented by a computer. Therefore, a description is given of a configuration of the image management system 5, and the description of a configuration of the communication terminal 7 is omitted, having the same or substantially same configuration as that of the image management system 5.

The image management system 5 includes a CPU 501, a ROM 502, a RAM 503, an HD 504, a hard disc drive (HDD) 505, a media drive 507, a display 508, a network I/F 509, a keyboard 511, a mouse 512, a compact-disc read only memory (CD-ROM) drive 514, and a bus line 510. The CPU 501 controls entire operation of the image management system 5. The ROM 502 stores programs such as an initial program loader (IPL) to boot the CPU 501. The CPU 501 uses the RAM 503 as a work area when executing programs or processing data. The HD 504 stores various data such as programs for the image management system 5. The HDD 505 controls reading and writing of data from and to the HD 504 under control of the CPU 501. The media drive 507 controls reading and writing (storing) of data from and to a recording medium 506 such as a flash memory. The display 508 displays various information such as a cursor, menus, windows, characters, and images. The network I/F 509 communicates data with another apparatus such as the communication terminal 3 and the communication terminal 7 via the communication network 9. The keyboard 511 includes a plurality of keys to allow a user to input characters, numbers, and various instructions. The mouse 512 allows a user to input an instruction for selecting and executing various functions, selecting an item to be processed, or moving the cursor. The CD-ROM drive 514 controls reading and writing of data from and to a CD-ROM 513 as an example of a removable recording medium. The bus line 510 electrically connects those parts or devices of the image management system 5 to each other as illustrated in FIG. 11. Examples of the bus line 510 include an address bus and a data bus.

Figure 12:
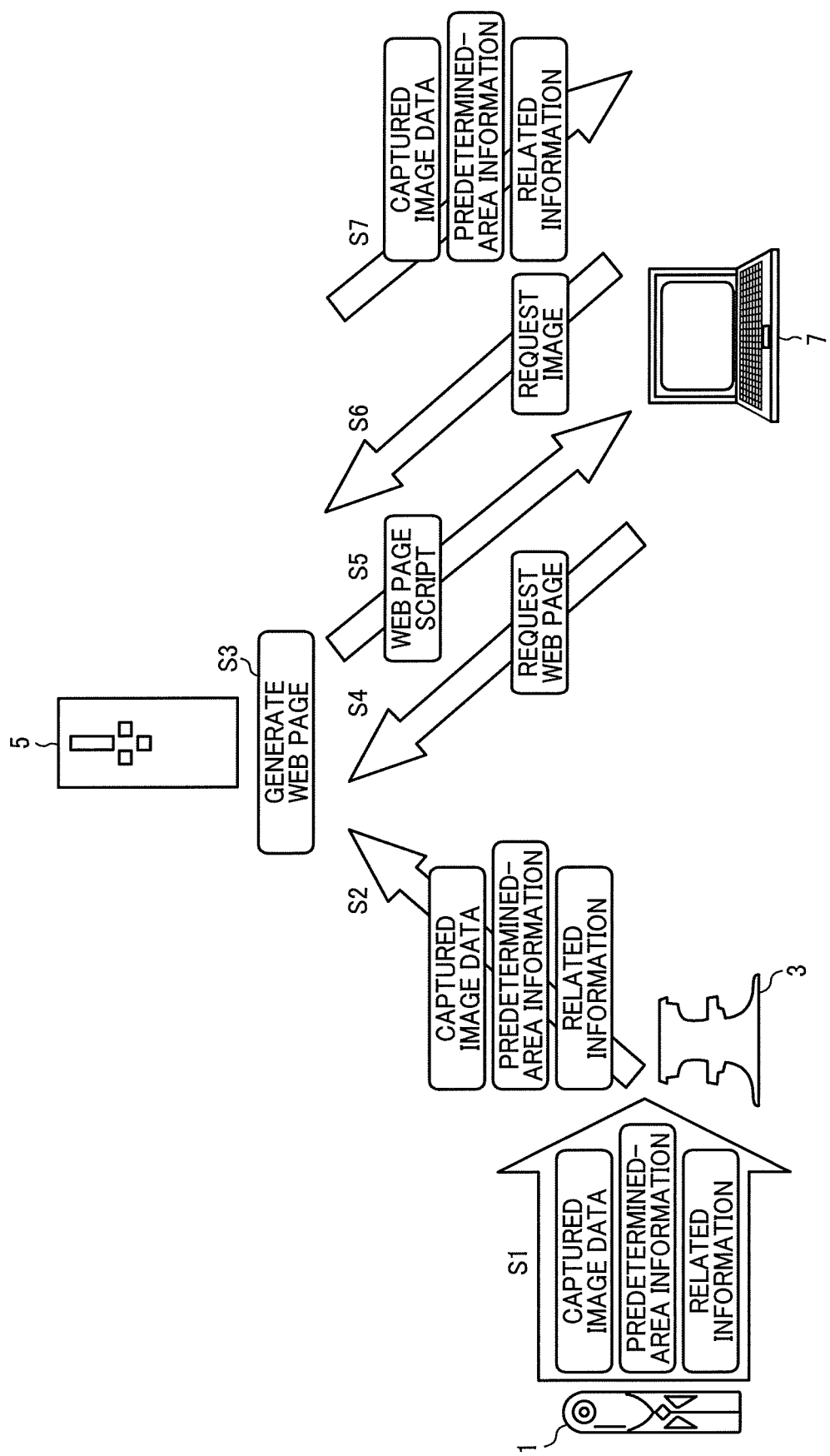
FIG. 12 is a view illustrating an overview of processing performed by the image management system according to an embodiment of the present invention.

Hereinafter, a description is given of an overview of processing performed by the image management system according to the present embodiment with reference to FIG. 12.

First, the communication terminal 3 acquires the captured-image data, the predetermined-area information, and the related information from the image capturing device 1 (S1). The communication terminal 3 transmits the captured-image data, the predetermined-area information, and the related information to the image management system 5 (S2). The image management system 5 stores and manages the received captured image data, the predetermined-area information, and the related information. The image management system 5 generates a WEB page including a script for acquiring captured image data (step S3). The communication terminal 7 transmits a request for the WEB page to the image management system 5 (step S4). In response to the request, the image management system 5 transmits the WEB page including the script to the communication terminal 7 (step S5). When the WEB page is read by the browser of the communication terminal 7, the script included in the WEB page is activated. According to the script, the communication terminal 7 transmits a request for the captured-image data to the image management system 5 (step S 6). In response to the request, the image management system 5 transmits the captured-image data, the predetermined-area information corresponding to the captured-image data, and the related information to the communication terminal 7 (step S 7).

Figure 13:
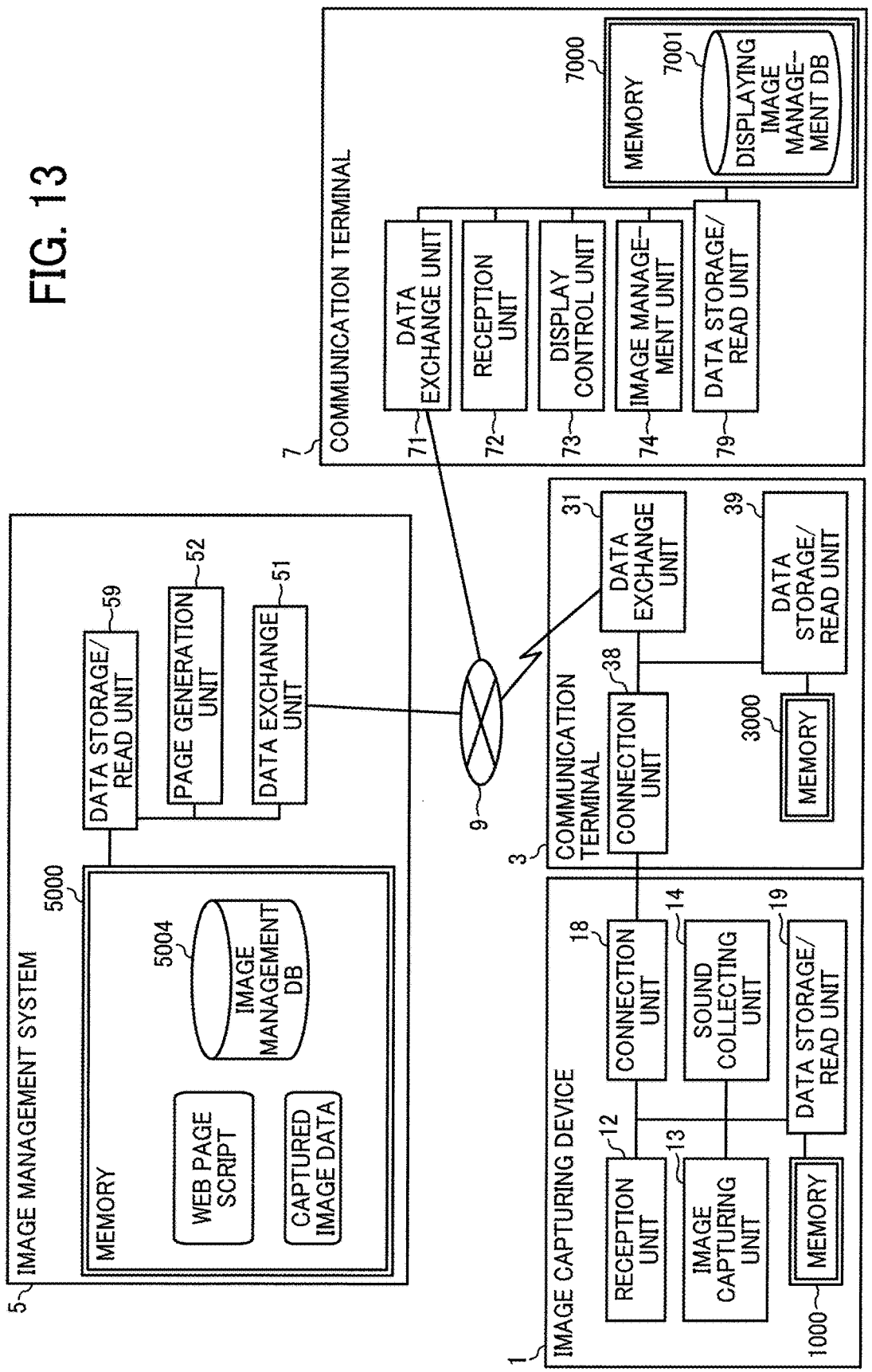
FIG. 13 is a block diagram illustrating a functional configuration of the imaging apparatus, communication terminal, and image communication system according to an embodiment of the present invention.

Hereinafter, a description is given of a functional configuration of the image communication system according to this embodiment. FIG. 13 is a block diagram illustrating functional configurations of the image capturing device 1, the communication terminal 3, the image management system 5, and the communication terminal 7, which constitute a part of the image communication system according this embodiment. In the image communication system illustrated in FIG. 13, the image management system 5 performs data communication with the communication terminal 3 and communication terminal 7 via the communication network 9.

As illustrated in FIG. 13, the image capturing device 1 includes a reception unit 12, an image capturing unit 13, a sound collecting unit 14, a connection unit 18, and a data storage/read unit 19. These functional blocks 12 to 19 are implemented by one or more hardware components illustrated in FIG. 9, when operating in accordance with instructions from the CPU 111 executing according to the program for the image capturing device 1, loaded to the DRAM 114 from the SRAM 113.

The image capturing device 1 further includes a memory 1000, which is implemented by the ROM 112, the SRAM 113, or the DRAM 114 illustrated in FIG. 9.

Hereinafter, a detailed description is given of these functional blocks 12 to 19 of the image capturing device 1 with reference to FIGS. 9 and 13.

The reception unit 12 of the image capturing device 1 is implemented by the operation unit 115 and the CPU 111, which operate in cooperation with each other, to receive an instruction input from the operation unit 115 according to a user operation.

The image capturing unit 13 is implemented by the imaging unit 101, the image processor 104, the imaging controller 105, and the CPU 111, which operate in cooperation with each other, to capture an image of the surroundings and acquire the captured-image data.

The sound collecting unit 14 is implement by the microphone 108 and the sound processor 109, when operating under control of the CPU 111, to collect sounds around the image capturing device 1.

The connection unit 18 is implement by an electrical contact, when operating under control of the CPU 111. The connection unit 18 is be provided with power from the communication terminal 3, and performs data communication.

The data storage/read unit 19 is implement by the CPU 111, when executing according to the program loaded to the DRAM 114, to store data or information in the memory 1000 and read out data or information from the memory 1000.

As illustrated in FIG. 13, the communication terminal 3 includes a data exchange unit 31, a connection unit 38, and a data storage/read unit 39. These functional blocks 31, 38 and 39 are implemented by one or more hardware components illustrated in FIG. 10, when operating in accordance with instructions from the CPU 301 executing according to the programs for the communication terminal 3, loaded to the RAM 303 from the EEPROM 304.

The communication terminal 3 further includes a memory 3000, which is implemented by the ROM 302, the RAM 303, and the EEPROM 304 illustrated in FIG. 10.

Hereinafter, a detailed description is given of these functional blocks 31, 38, and 39 with reference to FIGS. 10 and 13.

The data exchange unit 31 of the communication terminal 3 is implemented by the communication unit 313 illustrated in FIG. 10, when operating under control of the CPU 301, to exchange data with the image management system 5 via the wireless router 9a and the communication network 9.

The connection unit 38 is implement by an electrical contact, when operating under control of the CPU 301, to supply power to the communication terminal 3 and perform data communication.

The data storage/read unit 39 is implement by the CPU 301, when executing according to the program loaded to the RAM 303, to store data or information in the memory 3000 and read out data or information from the memory 3000.

A description is given of a functional configuration of the image management system 5. The image management system 5 includes a data exchange unit 51, a page generation unit 52, and a data storage/read unit 59. These functional blocks 51, 52 and 59 are implemented by one or more hardware components illustrated in FIG. 11, when operating in accordance with instructions from the CPU 501 executing according to the programs for the image management system 5, loaded to the RAM 503 from the HD 504.

Figure 11:
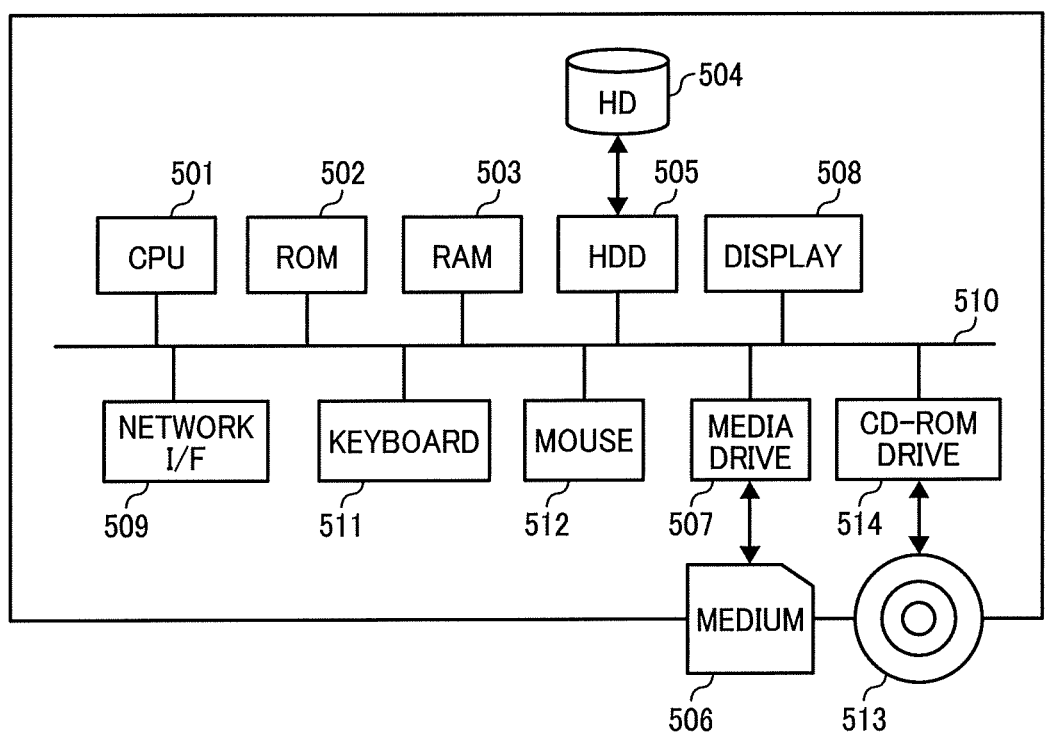
FIG. 11 is a block diagram illustrating a hardware configuration of any one of the image management system and the second communication terminal of FIG. 8 according to an embodiment of the present invention.

The image management system 5 further includes a memory 5000, which is implemented by the RAM 503 and the HD 504 illustrated in FIG. 11. The memory 5000 includes an image management database (DB) 5004 by the image management table. The memory 5000 further includes a web page script 5006 and captured image data 5008.

FIG. 14A is an example of the image management table. The image management table stores a device ID of the image capturing device 1, a URL (Uniform Resource Locator) of the captured image data that captured by the image capturing device 1, a captured time, a site name indicating the site of captured image, a captured location, and predetermine-area information of captured image data in association with each other. The URL of the captured image data includes the file name as identification information of captured image data.

Hereinafter, a detailed description is given of the functional blocks 51 to 56 and 59 of the image management system 5 with reference to FIGS. 11 and 13.

The data exchange unit 51 of the image management system 5 is implemented by the network I/F 509 illustrated in FIG. 11, when operating under control of the CPU 501. The data exchange unit 51 exchanges data or information with the communication terminal 3 or the communication terminal 7 via the communication network 9.

The page generation unit 52 is implement by the CPU 501 illustrated in FIG. 11, when executing according to the program loaded to the RAM 503. The page generation unit 52 generates the WEB page to acquire the captured image data which is stored in the memory 5000. The image management system 5 may manage uploading of the WEB page from any communication terminal without generating the WEB page.

The data storage/read unit 59 is implement by the HDD 505, when operating under control of the CPU 501, to store data or information in the memory 5000 and read out data or information from the memory 5000.

Hereinafter, a description is given of a functional configuration of the communication terminal 7 with reference to FIGS. 11 and 13. The communication terminal 7 includes a data exchange unit 71, a reception unit 72, a display control unit 73, an image management unit 74, and a data storage/read unit 79. These functional blocks 71 to 74, and 79 are implemented by one or more hardware components illustrated in FIG. 11, when operating in accordance with instructions from the CPU 501 executing according to the programs for the communication terminal 7, loaded onto the RAM 503 from the HD 504.

The communication terminal 7 further includes a memory 7000, which is implemented by the RAM 503 and the HD 504 illustrated in FIG. 11. The memory 7000 includes a displaying image management DB 7001 by the displaying image management table.

FIG. 14B is a conceptual diagram showing the displaying image management table. In the displaying image management table, an image ID of the captured image data to be displayed, a site name of the site where the image was captured, a capturing location, a captured time, a predetermined-area information indicating the predetermined-area T0 which is a reference in the captured image data, predetermined-area information indicating an area (predetermined-area Tc) currently displayed in the captured image data, and a reproduction time for identifying a frame to be displayed when the captured image data is a movie or image, are managed in association with each other.

Hereinafter, a detailed description is given of functional blocks 71 to 74 and 79 with reference to FIG. 13.

The data exchange unit 71 of the communication terminal 7 is implemented by the network I/F 509 illustrated in FIG. 11, when operating under control of the CPU 501. The data exchange unit 71 exchanges data or information with image management system 5 via the communication network 9.

The reception unit 72 is implement by the keyboard 511 and the mouse 512 illustrated in FIG. 11, when operating under control of the CPU 501, to receive an instruction from a user.

The display control unit 73 is implemented by the CPU 501 illustrated in FIG. 11, when executing according to the program loaded onto the RAM 503, to control the display 508 of the communication terminal 7 to display images.

The image management unit 74 is implemented by the CPU 501 illustrated in FIG. 11, when executing according to the program loaded onto the RAM 503, to control for displaying a various image on the display 508 of the communication terminal 7.

The data storage/read unit 79 is implement by the HDD 505, when operating under control of the CPU 501, to store data or information in the memory 7000 and read out data or information from the memory 7000.

Recording media such as a CD-ROM in which the above-mentioned programs are stored, and the HD 504 in which these programs are stored can be provided either domestically or abroad as a program product.

Next, the processing of this embodiment will be described. First, with reference to FIG. 15, a process of uploading an image will be described. FIG. 15 is a sequence diagram showing an example of a process of uploading an image.

The installer X captures a full spherical panorama image at the site by the image capturing device 1. The subject is, for example, real estate to sell. When the full spherical panoramic image is captured, the storage/readout unit 19 of the image capturing device 1 stores the captured image data, the related information, the predetermined-area information, and the device ID of the image capturing device 1 in the storage unit 1000. The related information includes the site name, the captured location, and the captured time. The predetermined-area information is preset at the time of factory shipment of the image capturing device 1 or arbitrarily set by the installer X after factory shipment. For example, the predetermined-area information indicates the range of ±15° from the center point of the image captured by the imaging element 103a (rH0, rV0, 30).

Figure 16A:
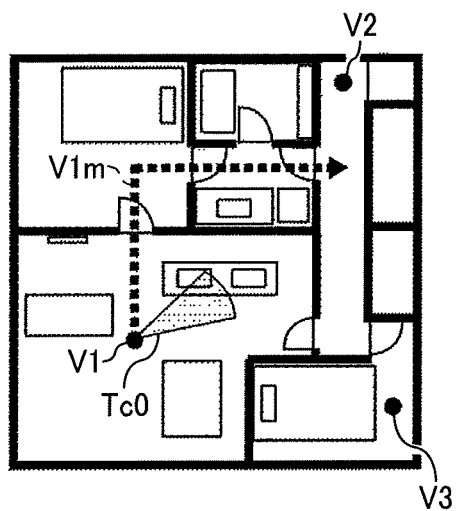
FIGS. 16A and 16B are examples of an image of a predetermined-area, a direction of imaging, and a point of view according to an embodiment of the present invention.
Figure 16B:
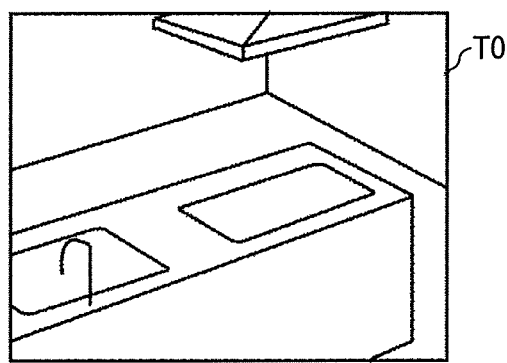

In one embodiment, in the plurality of full spherical panoramic images captured at the same location, an area in which a predetermined same object is captured is set as a basis predetermined-area T0. FIG. 16A is a conceptual diagram showing an example of a viewpoint as a captured location and a direction Tc0 of the predetermined-area T0 serving as a reference. FIG. 16B is a conceptual diagram showing an example of an image of the predetermined-area T0 in the full spherical panoramic image. In the example of FIG. 16, an area in which a kitchen is captured as a predetermined object in the plurality of full spherical panoramic images captured at the same viewpoint V1 in the room is set as the basis predetermined-area T0. A method of setting the basis predetermined-area T0 will be described.

The installer X captures with the image capturing device 1 at the viewpoints V1, V 2, V 3 multiple times, for example, in the morning and evening, different seasons, and the like. In the first method, the installer X directs the imaging element 103a of the image capturing device 1 in the same direction in capturing the plurality of times with the same viewpoint. For example, in capturing the plurality of times at the viewpoint V1, the installer X directs the imaging element 103a to the kitchen direction Tc0. In this case, the image capturing device 1 records the range of ±15° from the center point of the image captured by the imaging element 103a as predetermined-area information (rH0, rV0, 30). In the first method, predetermined-area information (rH0, rV0, 30) automatically recorded by the image capturing device 1 is set as predetermined-area information indicating the predetermined-area T0.

In the second method, the installer X directs the image capturing device 1 in an arbitrary direction in the plurality of times of capturing with the same viewpoint. After capturing, the image capturing device 1, the communication terminal 3, or the image management system 5 accepts designation of one range in which the same object is captured in the plurality of the full spherical panoramic images. The image capturing device 1, the communication terminal 3, or the image management system 5 sets the predetermined-area information indicating the designated range as the predetermined-area information indicating the predetermined-area T0 as the reference. It should be noted that designation of one range may be performed by the user, or may be performed by an apparatus using a technology of image processing such as comparison of feature points.

When capturing a moving image, the installer X may capture the image capturing device 1 at the same viewpoint V1 for a predetermined period of time, or may capture multiple times by moving the viewpoint V1 on the same flow line V1m at the same speed.

Hereinafter, a case where the predetermined-area T0 is set by the first method will be described. After capturing, the installer X connects the image capturing device 1 to the communication terminal 3. After the connection, the connection unit 38 of the communication terminal 3 transfers the captured image data, the related information, the predetermined-area information, and the device ID of the image capturing device 1 from the storage unit 1000 of the image capturing device 1 to the communication terminal 3 (step S21). The transferred predetermined-area information is used as predetermined-area information indicating the predetermined-area T0. The related information includes the device ID of the image capturing device 1, the captured location, the captured date, and the like.

The transmitting/receiving unit 31 of the communication terminal 3 transmits a registration request of the image to the image management system 5 (step S 22). The registration request of the image includes the captured image data transferred to the communication terminal 3 in step S21, the related information, and the predetermined-area information indicating the predetermined-area T0.

The transmission/reception unit 51 of the image management system 5 receives the registration request of the image transmitted by the communication terminal 3. The storing/reading unit 59 of the image management system 5 allocates a URL to the received captured image data and stores the URL and the captured image data in the storage unit 5000 (step S23).

The storing/reading unit 59 of the image management system 5 stores, for each captured image data sent from the communication terminal 3, the URL allocated in step S23, predetermined-area information indicating the predetermined-area T0, and related information (step S24, see FIG. 14A). The related information includes the device ID, the captured date, and the captured location.

In step S25, the page generation unit 52 of the image management system 5 generates a WEB page including a script for acquiring the captured image data to which the URL is assigned in step S23. The storage/readout unit 59 of the image management system 5 allocates a URL to the generated WEB page and stores it in the storage unit 5000.

The WEB page is generated for each site name managed in the image management table (see FIG. 14A). The format of the WEB page is not particularly limited, however, for example, the format is HTML (Hyper Text Markup Language) format. The page generation unit 52 generates the WEB page including a user interface for selecting a viewpoint at the site. The user interface is, for example, a character, an icon, or a pull-down on a sketch of a real estate. Further, the page generating unit 52 includes the script for acquiring the captured image data of the selected viewpoint in the WEB page. It should be noted that the page generation unit 52 may generate one script for each site, one script for each viewpoint, or one script for each image.

Figure 17:
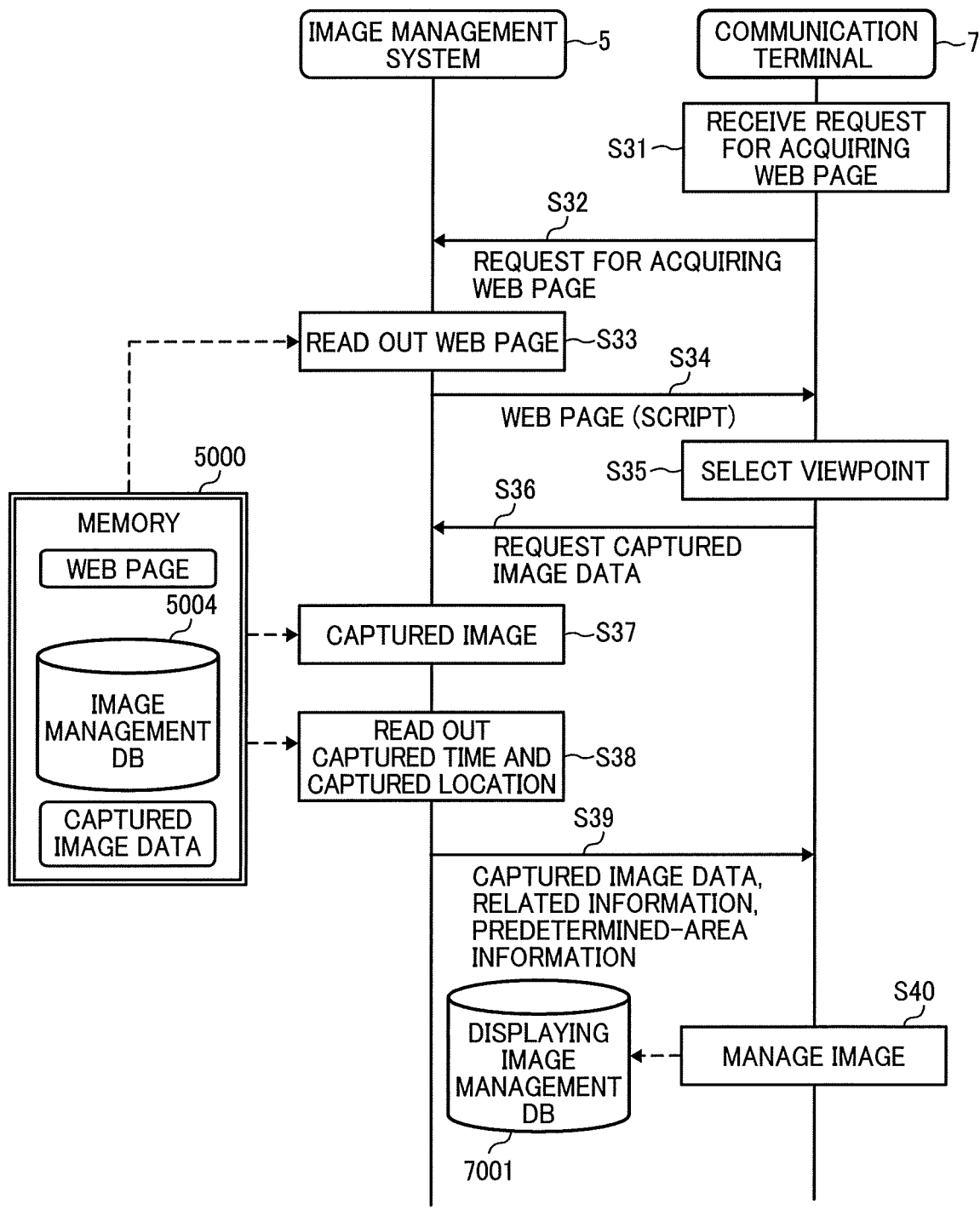
FIG. 17 is a sequence diagram illustrating a process of acquiring the image by the communication terminal according to an embodiment of the present invention.

Next, a process of the communication terminal 7 acquiring the image from the image management system will be described. FIG. 17 is a sequence diagram showing an example of a process in which the communication terminal 7 acquires the image.

When the browser is activated in the communication terminal 7, the display control unit 73 causes the display 508 to display the screen of the browser. When the URL of the WEB page of the "property A" is input by the user in the input field of the browser, or when the link to the WEB page of the "property A" displayed on the screen is selected, the reception unit 72 of the communication terminal 7 accepts a request to acquire the WEB page of the "property A" (step S31). When the acquisition request of the WEB page of the "property A" is accepted in the reception unit 72, the transmission/reception unit 71 of the communication terminal 7 transmits the request to acquire the WEB page of the "property A" to the image management system 5 (step S32). The acquisition request of the WEB page of the "property A" includes the URL of the WEB page of the "property A".

The transmission/reception unit 51 of the image management system 5 receives the request to acquire the WEB page of the "property A" transmitted by the communication terminal 7. In response to this acquisition request, the storage/readout unit 59 of the image management system 5 reads the WEB page of the URL included in the acquisition request from the storage unit 5000 (step S33). The transmission/reception unit 51 of the image management system 5 transmits the WEB page read out in step S33 to the communication terminal 7 (step S34). The WEB page includes the script generated in step S25.

Figure 18:
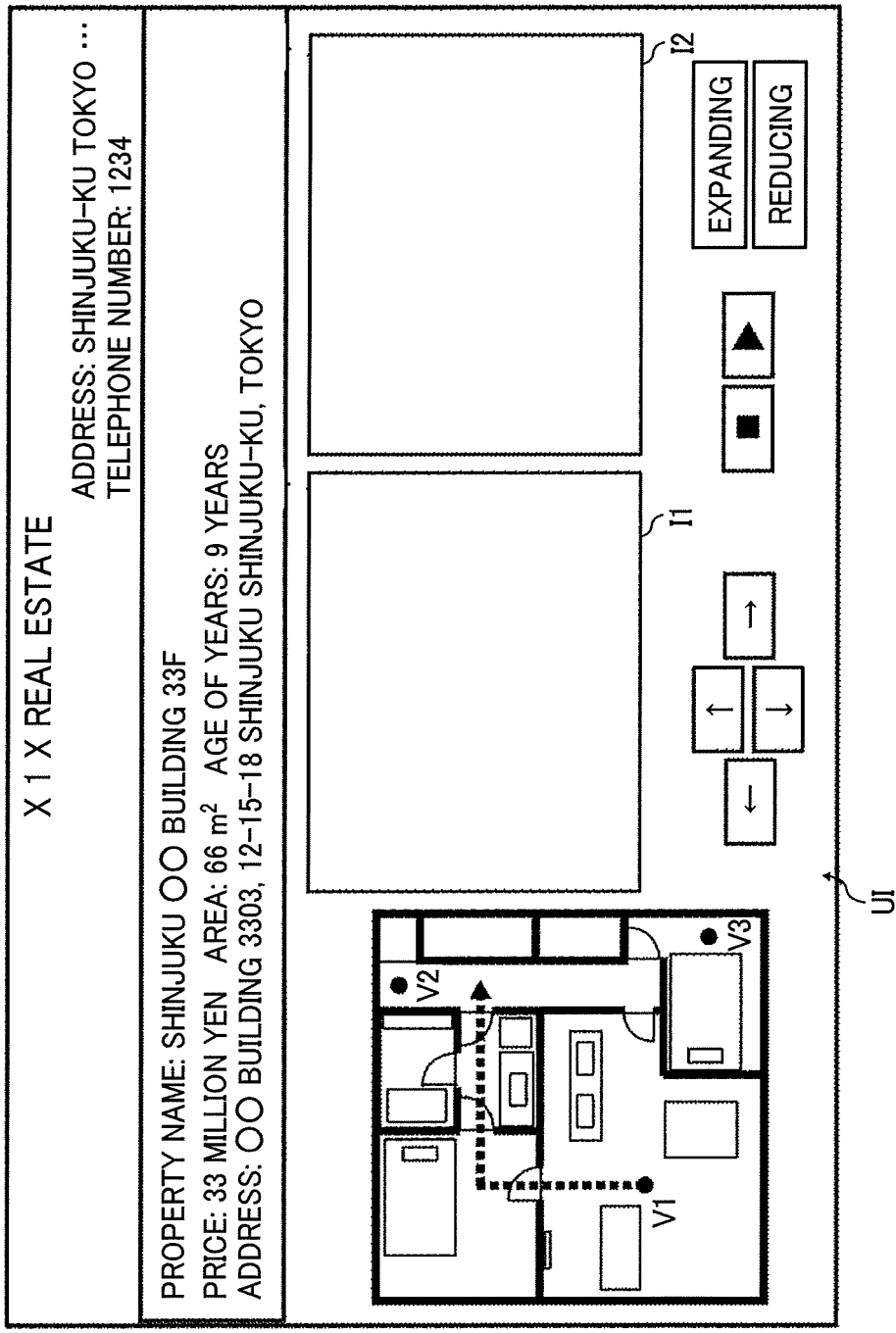
FIG. 18 is a view illustrating an example of the screen according to an embodiment of the present invention.

The transmitting/receiving unit 71 of the communication terminal 7 receives the WEB page of the "property A" transmitted by the image management system 5. The display control unit 73 of the communication terminal 7 displays the WEB page of the "property A" on the screen of the browser. FIG. 18 is a conceptual diagram showing an example of a screen to be displayed. The WEB page of the "property A" includes areas I 1 and I 2 for displaying the predetermined-area Tc in the captured image data. On the WEB page of the "property A", as a user interface UI, there are displayed characters on a sketch for selecting a viewpoint, buttons for moving, enlarging and reducing the predetermined-area Tc, and when the image to be displayed is the moving image, a button for reproducing or stopping the moving image, and the like.

When the accepting unit 72 of the communication terminal 7 accepts selection of the viewpoint V1 by the user on the screen of the browser (step S35), the processing of the script included in the WEB page is started. In accordance with this script, the transmission/reception unit 71 of the communication terminal 7 transmits a request for captured image data of the viewpoint V1 of the "property A" to the image management system 5 (step S36). The request of the captured image data includes the URL "http://example.co/i11.mp4" or "http://example.co/i21.mp4" of the captured image of the viewpoint V1. These URLs are included in the script of the WEB page.

The transmitting/receiving unit 51 of the image management system 5 receives the request of the captured image data of the viewpoint V1 of the "property A" transmitted by the communication terminal 7. In response to this request, the storage/readout unit 59 of the image management system 5 reads the captured image data of the URL included in the request of the captured image data from the storage unit 5000 (step S37). In addition, the storing/reading unit 59 searches the image management table (see FIG. 14 A) using the URL of the captured image data as a search key and stores the related information such as the captured date, the site name, the captured location and the like, and the predetermined-area information of the predetermined-area T0 (step S38). The transmitting and receiving unit 51 of the image management system 5 transmits the captured image data of the viewpoint V1 read in step S36, the related information read out in step S37, and the predetermined-area information of the predetermined-area T0 to the communication terminal 7 (Step S39).

The transmitting/receiving unit 71 of the communication terminal 7 receives the captured image data of the viewpoint V1, the related information, and the predetermined-area information of the predetermined-area T0 transmitted by the image management system 5. The storage/readout unit 79 of the communication terminal 7 causes the storage unit 7000 to store captured image data received by the transmission/reception unit 71.

Also, when the first captured image data, the related information corresponding to the first captured image data, and the predetermined-area information of the predetermined-area T0 are received by the transmitting/receiving unit 71 of the communication terminal 7 from among the captured image data of the viewpoint V1, The image management unit 74 displays a record including the image ID of the received captured image data, the related information (the site name, the captured location, the captured date), and the predetermined-area information of the predetermined-area T0 in the display image management table (FIG. 14B) (step S40). The image ID of the captured image data is, for example, the file name of the captured image data. In addition, the image management unit 74 records the same value as the predetermined-area information of the received predetermined-area T0 as the predetermined-area Tc of the current viewpoint in the record. Further, in the display image management table, when the captured image data is a moving image, the default value "00:00" is recorded as the reproduction time in the record where the captured image data is managed.

Figure 19:
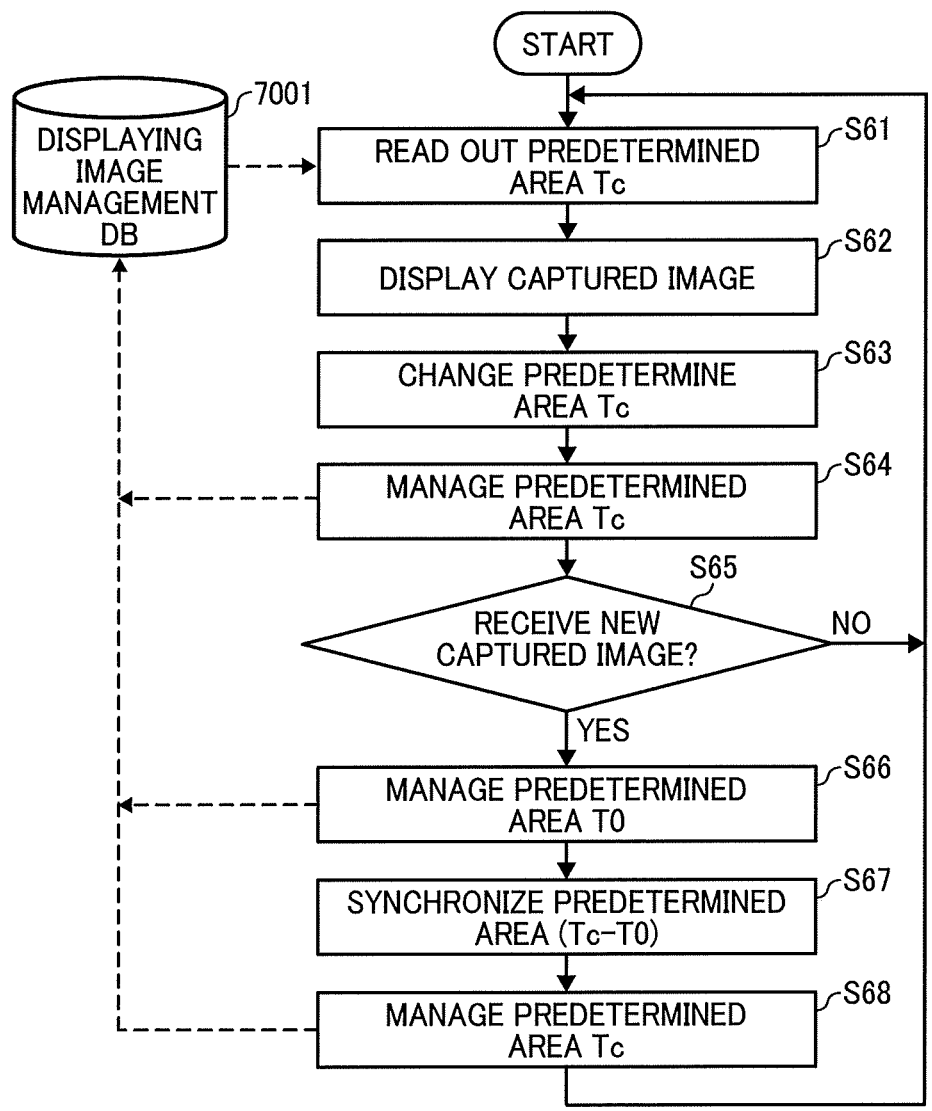
FIG. 19 is a flowchart illustrating a process of controlling to display the image on the communication terminal according to an embodiment of the present invention.

With reference to FIG. 19, an example of a process of controlling the display of images in the communication terminal 7 will be described. FIG. 19 is a flowchart showing an example of processing for controlling the display of images in the communication terminal 7.

The storage/readout unit 79 of the communication terminal 7 reads a set of the image ID, the predetermined-area information of the present predetermined-area Tc, and the reproduction time from the record of the display image management table (step S61). For example, the storage/readout unit 79 reads the image ID "i11", the predetermined-area information (rH0rV0, angle 30) of the predetermined-area Tc and the reproduction time "00:00" from the display image management table of FIG. 14B.

Figure 20A:
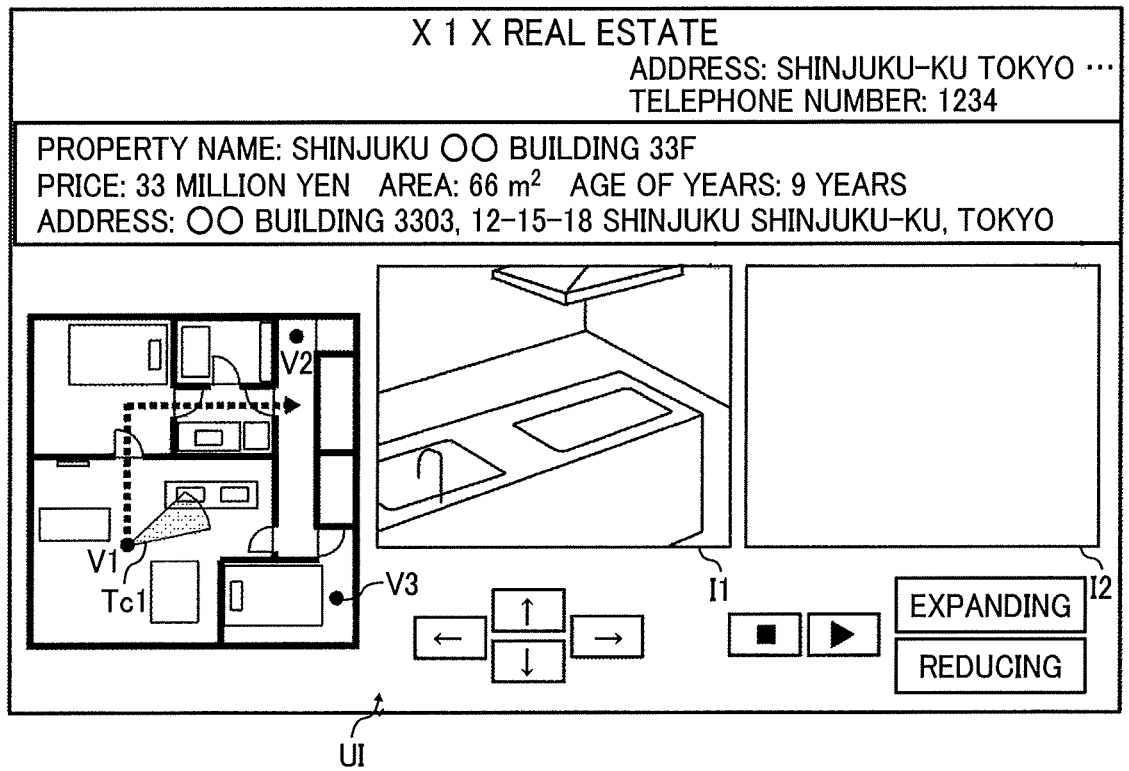
FIGS. 20A and 20B are views illustrating an example of the screen according to an embodiment of the present invention.

The display control unit 73 of the communication terminal 7 extracts the image which is indicated predetermined-area information (rH0rV0, angle 30) from the frame at the reproduction time "00:00" among the captured image data of the image ID "i11" read out in step S61, and displays the image in the area I1 of the screen of the browser (step S62). FIG. 20A is a conceptual diagram showing an example of the browser screen in step S62. The direction Tc1 on the sketch diagram of FIG. 20A shows the direction of the predetermined-area Tc.

The image management unit 74 of the communication terminal 7 changes the current predetermined-area Tc of the image managed by the display image management table in accordance with the automatic operation pattern preset in the script included in the WEB page or according to the operation input by the user (Step S63). A method of changing the predetermined-area Tc is not particularly limited, but the following is exemplified. Hereinafter, the predetermined amount also includes a negative value. (1) Rotation: For example, a predetermined amount such as (1, 0) is added to the predetermined-area information (x (rH), y (rV)) of the predetermined-area Tc for each loop processing of step S63. (2) Movement: For example, a predetermined amount such as (180, 0) is added to predetermined-area information (x (rH), y (rV)) of the predetermined-area Tc. (3) Zoom: A predetermined amount such as 1 is added to predetermined-area information (angle α) of the predetermined-area Tc. (4) Playback: Advance the playback time in the moving image for each loop process in step S63, for example, a predetermined amount such as one frame. (5) Stop: Restore the playback time in the movie to the default. (6) Combinations of (1) to (5): for example, after the predetermined-area information (x (rH)) of the predetermined-area Tc reaches the predetermined threshold in the processing of (1) according to the pattern of automatic operation, 2) adds a predetermined amount to the predetermined region information (x (rH), y (rV)) of the predetermined region Tc.

When an operation input by the user interface UI is accepted during automatic operation by a script, the image management unit 74 may changes the predetermined-area Tc based only on the operation input, or based on both the operation input and the automatic operation. For example, when an instruction by the automatic operation for adding the predetermined amount to predetermined-area information (x (rH)) of a predetermined region Tc and an instruction by the input operation for adding to the predetermined-area information (y (rV)) of a predetermined-area Tc, the image management unit 74 adds the predetermined amount to only the predetermined-area information (y (rV)) or adds the predetermined amount to the predetermined-area information (x (rH)) after adding the predetermined amount to the predetermined-area information (y (rV))

For example, in step S63, the image management unit 74 of the communication terminal 7 reads the predetermined-area information (rH0rV0, angle 30) from the records storing the image ID "i11" of the display image management table of FIG. 14B, and adds a predetermined amount (0, 0, 15). The storage/readout unit 79 of the communication terminal 7 records a predetermined-area information (rH0rV0, angle 45) of the changed predetermined-area Tc in association with the image ID "i11" in the display image management table (step S64). Table 1 shows an example of the display image management table updated by the process of step S64.

Table 1 is illustrated in FIG. 29.

In step S36, the transmitting/receiving 71 of the communication terminal 7 requests a plurality of captured image data of the viewpoint V1 one by one according to the script of the WEB page. In step S39, the transmitting/receiving unit 51 of the image management system 5 transmits the plurality of captured image data of the viewpoint V1 one by one according to the request. As a result, the transmitting/receiving unit 71 of the communication terminal 7 receives the plurality of captured image data of the viewpoint V1 one by one. The image management unit 74 of the communication terminal 7 determines whether new captured image data not yet managed in the display image management table among the plurality of captured image data of the viewpoint V1 is received (step S65 of FIG. 19).

When it is determined in step S65 that new captured image data is received (YES), the image management unit 74 of the communication terminal 7 stores, in the display image management table, the captured location, the site name, the captured date, and the predetermined-area information of the reference predetermined-area T0 which are sent from image management system 5 with new captured image data and image ID of the new captured image data in association with each other (step S66). Table 2 shows an example of the display image management table updated in step S66.

Table 2 is illustrated in FIG. 30.

The image management unit 74 of the communication terminal 7 synchronizes difference between the current predetermined-area Tc related to the captured image data previously managed in the display image management table and the predetermined-area information of the reference predetermined-area T0 with the difference between the current predetermined-area Tc related to the captured image data newly managed in the table and the predetermined-area information of the reference predetermined-area T0 (Step S67). For example, The image management unit 74 calculates the difference Δ (0, 0, 15) between the current predetermined-area Tc related to the captured image data of the image ID "i11" previously managed in the display image management table (table 2) and the predetermined-area information of the reference predetermined-area T0 (rH0rV0, angle 45) Subsequently, in the display image management table of Table 2, the image management unit 74 adds, to the calculated difference Δ (0, 0, 15), the predetermined-area information (rH0, rV0, angle 30) of the predetermined-area T0 of the record in which the image ID "i21" is newly recorded. As a result, the image management unit 74 obtains the predetermined-area information (rH0rV0, angle 45) of the predetermined-area Tc related to the captured image data of the image ID "i21". Further, the image management unit 74 synchronizes, with the reproduction time related to the captured image data of the image ID "i21", the reproduction time "00:00" in the record in which the image ID "i11" is recorded before the display image management table.

The storing/reading unit 79 of the communication terminal 7 stores the predetermined-area information (rH0rV0, angle 45) of the predetermined-area Tc related to the captured image data of the image ID "i21" obtained at the step S67 and the reproduction time "00:00" in the display image management table (step S68). Table 3 shows an example of the display image management table updated in step S68.

[HK1] Table 3 is illustrated in FIG. 31.

After being determined NO in the step S65, or after the process of step S68 is completed, the storing/reading unit 79 of the communication terminal 7 returns to step S61, and reads out, from the record of the updated display image management table, a set of the image ID, the predetermined-area information of the current predetermined-area Tc and the reproduction time. When the display image management table is updated as shown in Table 3, the storing/reading unit 79 reads out the set of the image ID "i11", the predetermined-area information of a predetermined-area Tc (rH0rV0, angle 45), and the reproduction time "00:00" and the set of the image ID "i21", the predetermined-area information (rH0rV0, angle 45) of the predetermined-area Tc, and the reproduction time "00:00".

The display control unit 73 of the communication terminal 7 extracts the image of the predetermined-area Tc indicated by predetermined-area information (rH0rV0, angle 45) from the frame at the reproduction time "00:00" among the captured image data of the read image ID "i11", and displays the extracted image in the area I1 of the screen of the browser.

Figure 20B:
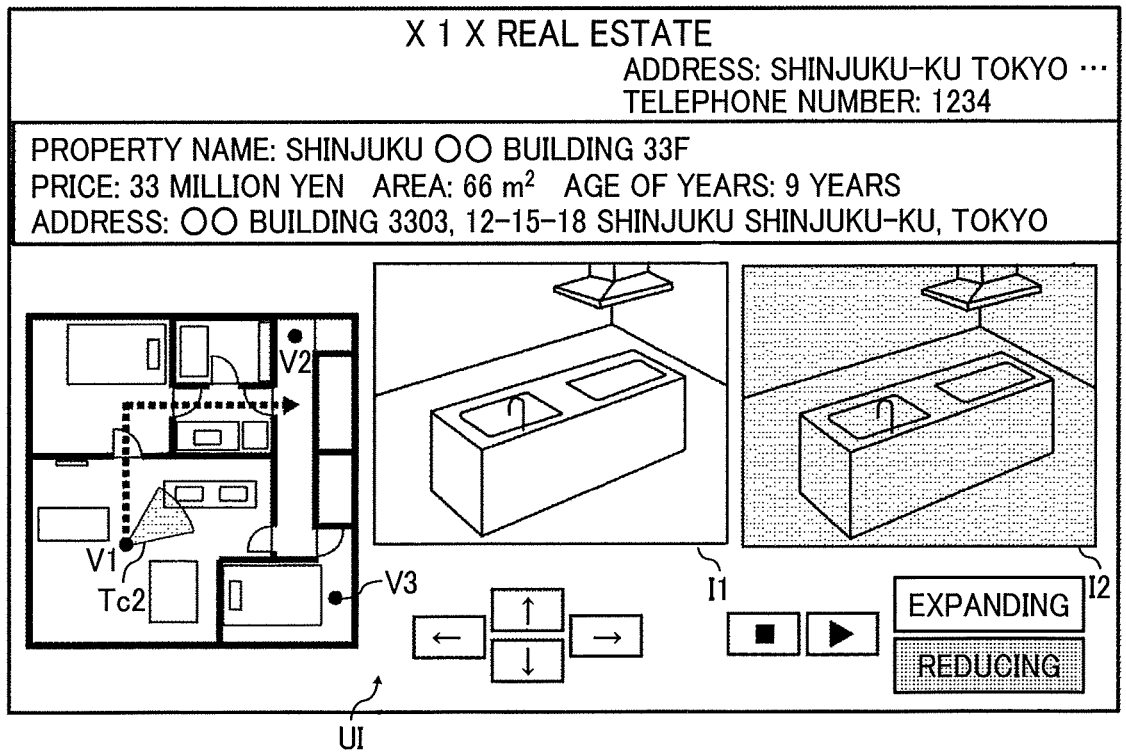

The display control unit 73 of communication terminal 7 extracts the image of the predetermined-area Tc indicated by the predetermined-area information (rH0rV0, angle 45) from the frame at the playback time "00:00" among the captured image data of the read image ID "i21", and displays the image in the area 12 of the browser screen (second time of step S62). FIG. 20B is a conceptual diagram showing an example of the browser screen in the second time of step S62. The direction Tc2 on the sketch drawing of FIG. 20B indicates the direction of the predetermined-area Tc. In the captured image data of the image ID "i21", although the script is applied later with respect to the captured image data of the image ID "i11", in the previous step S67, the two predetermined-areas (Tc–T0) are synchronized, the image in the same direction is displayed from the viewpoint V1.

The image management unit 74 of the communication terminal 7 changes the current predetermined-area Tc related to each captured image data managed in the display image management table according to the pattern of automatic operation set in the script or according to the operation input by the user (second times of step S63).

In the process of the second times of step S63, a case where a predetermined value (180, 0, 0) is added to the predetermined-area information (rH, rV, α) of the predetermined-area Tc will be described In the display image management table of Table 3, the image management unit 74 of the communication terminal 7 adds (180, 0, 0) to the predetermined-area information (rH0, rV0, 0) of the predetermined-area Tc in the record in which the image ID "i11" is stored. Further, in the display image management table of Table 3, the image management unit 74 of the communication terminal 7 adds, to (180, 0, 0), the predetermined-area information (rH0, rV0, 0) of a predetermined-area Tc in the record in which the image ID "i21" is stored.

In the display image management table, the storing/reading unit 79 of the communication terminal 7 stores the value changed in the second step S63 as the predetermined-area information of the predetermined-area Tc related to the captured image data of the image ID "i11" and the predetermined-area information of the predetermined-area Tc related to the captured image data of the image ID "i21" (second step S64). Table 4 shows an example of the display image management table updated by the process of step S64.

[HK2] Table 4 is illustrated in FIG. 32.

Subsequently, in the third loop processing, the storage/readout unit 79 of the communication terminal 7 reads out the set of the image ID and the predetermined-area information of the current predetermined-area Tc from each record of the updated display image management table of Table 4 (Third step S61).

Figure 21A:
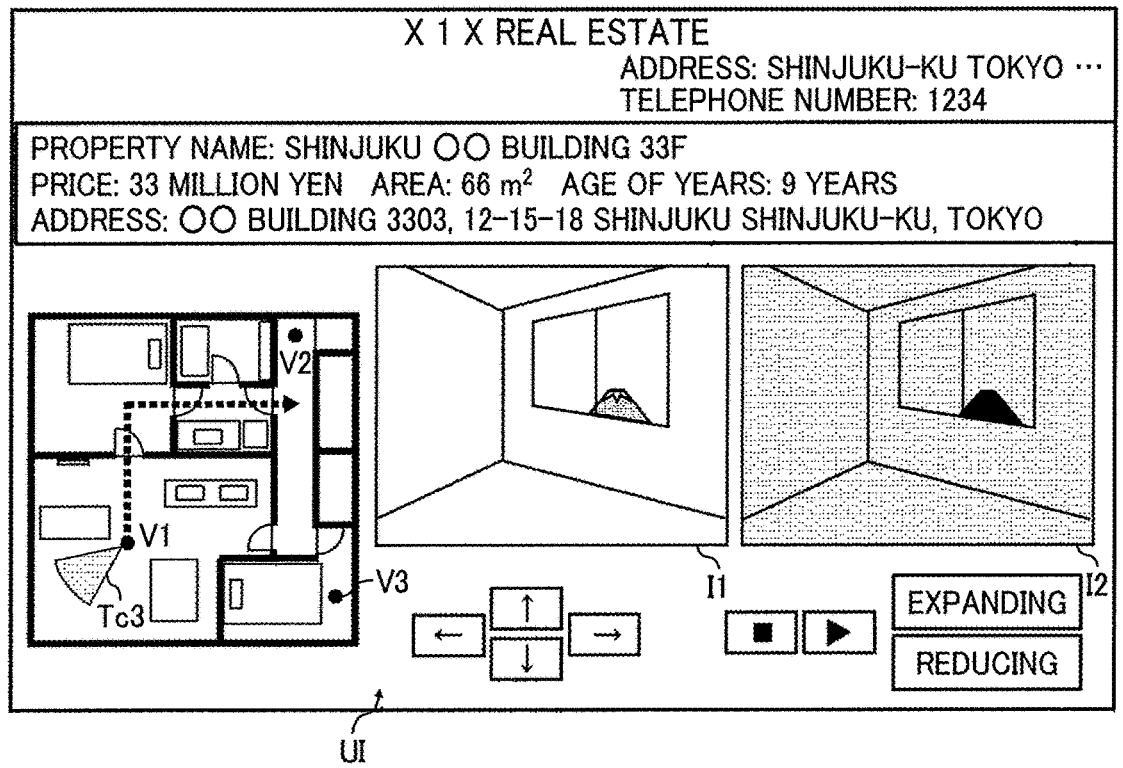
FIGS. 21A and 21B are views illustrating an example of the screen according to an embodiment of the present invention.

The display control unit 73 of the communication terminal 7 extracts the image of the predetermined-area Tc indicated by the predetermined-area information (rH 180, rV0, angle 45) from the frame at the reproduction time "00:00" among the captured image data of the read image ID "i11", and displays the image in the area I1 of the screen of the browser. In addition, the display control unit 73 of the communication terminal 7 extracts the image of the predetermined-area Tc indicated by the predetermined-area information (rH 180, rV0, angle 45) from the frame at the reproduction time "00:00" among the captured image data of the read image ID "i21", and displays the image in the area I2 of the screen of the browser (third step S62). FIG. 21A is a conceptual diagram showing an example of the screen in the third step S62. The direction Tc3 on the sketch diagram of FIG. 21A shows the direction of the predetermined-area Tc. In the second step S63, the images in the same direction are displayed from the viewpoint V1, since the predetermined-areas (Tc–T0) of the two images are synchronized with each other by the same predetermined values are add to the predetermined-area information of the predetermined-area Tc related to the captured image data of the image ID "i11" and the predetermined-area information of the predetermined-area Tc related to the captured image data of the image ID "i21".

In the communication terminal 7, while the WEB page is being displayed, the loop processing of the steps S61 to S68 is repeatedly executed according to the script.

Figure 21B:
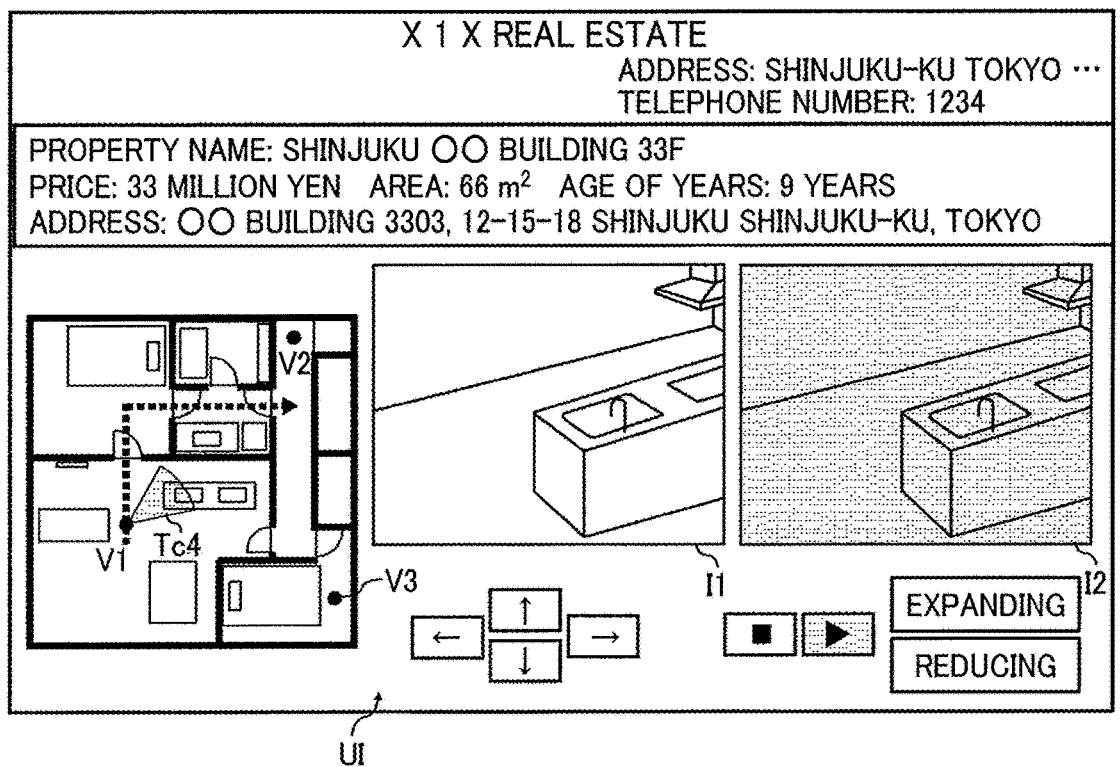

In the above description, the case where the changing method in step S63 is zooming or moving is described. When the changing method is rotating, the "rotating" process is the same as the "moving" process except that a predetermined amount is added to the predetermined-area information of the predetermined-area Tc at every step S63 in the loop processing. When the change method is playback, the "playback" process is same as the "moving" process except for the point that the time for one frame is added to the playback time of all the records in the display image management table every time step S63 in the loop process. FIG. 21B is a conceptual diagram showing an example of the screen in step S62 when the change is playback. The direction Tc 4 on the sketch diagram of FIG. 21B is the direction of the predetermined-area Tc. When captured image data captured by moving the same flow line at the same speed is reproduced, a plurality of images in the same direction Tc4 are displayed from the same viewpoint V1 in the arbitrary reproduction time.

<<<Variation A of Embodiment>>>

Figure 22:
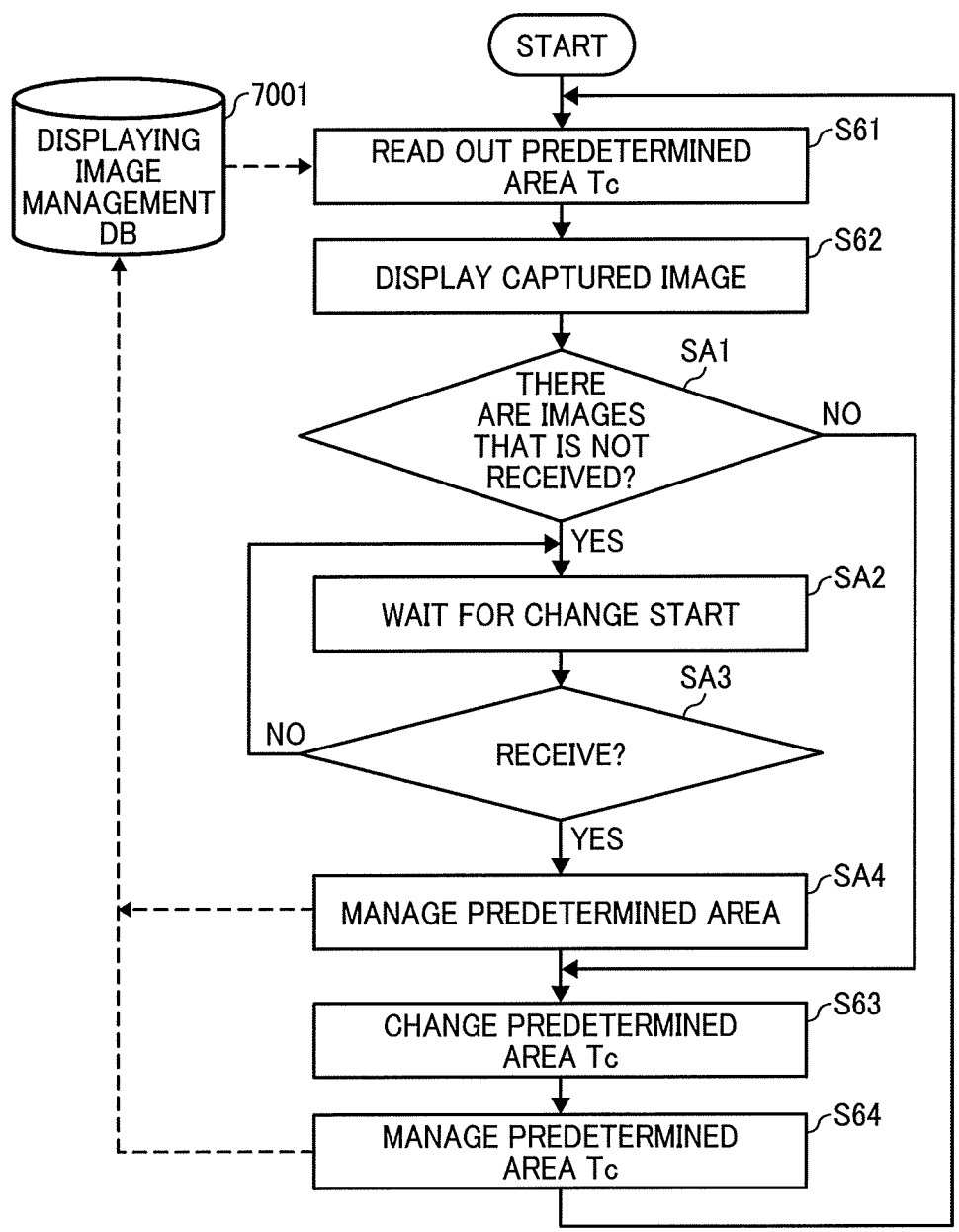
FIG. 22 is a flowchart illustrating a process of controlling to display the image by the communication terminal according to an embodiment of the present invention.

Subsequently, points that are different from the above-described embodiment with respect to the variation A of the embodiment will be described. FIG. 22 is a flowchart showing an example of the process in which the communication terminal 7 controls the display of the image in the modification example A. The processing up to displaying the image first received in step S62 is the same as in the above embodiment.

After the first received image is displayed in step S62, the image management unit 74 of the communication terminal 7 determines whether the captured image data still not received by the communication terminal 7 among the plurality of captured image data of the viewpoint V1 (step SA1).

If it is determined in step SA1 that there is un-received captured image data (YES), the image management unit 74 of the communication terminal 7 waits for the start the change of the current predetermined-area Tc of the captured image data already received (Step SA2). That is, even if a pattern of automatic operation is preset in the script, or even if an operation input by the user is accepted, the image management unit 74 does not change the current predetermined-area Tc of the captured image data.

The image management unit 74 of the communication terminal 7 determines whether or not un-received captured image data is received (step SA3). If it is determined that the un-received captured image data is not received (NO) at step SA3, the image management unit 74 waits for the start of change of the predetermined-area Tc.

If it is determined that the un-received captured image data is received at step SA3 (YES), the image management unit 74 of the communication terminal 7 stores the image ID of the newly received captured image data, the related data (captured location, site name, captured date) which is sent together with the newly received captured image data from the image management system 5, and predetermined-area information of a predetermined predetermined-area T0 as a reference in the display image management table in associate with each other (step SA4). In addition, the image management unit 74 stores the same value with the predetermined-area information of the received predetermined-area T0 as the predetermined-area Tc of the current viewpoint with respect to the received captured image data, and stores the default value "00:00" in the display image management table as the reproduction time.

When records relating to all the received captured image data are stored in the display image management table, the image management unit 74 of the communication terminal 7 starts changing the current predetermined-area Tc (step S63). The process of changing the predetermined-area Tc, the process of managing the changed predetermined-area Tc (step S64), the process of reading the changed predetermined-area Tc in the next loop process (step S61), and the process of displaying the area Tc (step S62) is the same as in the above embodiment, so the description is omitted.

In the variation A of the embodiment, the image management unit 74 waits for the change of the predetermined-area Tc until all the captured image data requested by the communication terminal 7 is received. As a result, it is possible to prevent the predetermined-area Tc from changing only a part of the captured image data requested by the communication terminal 7, thus it is possible to synchronize the predetermined area (Tc–T0) of all the captured image data.

<<<Variation B of Embodiment>>>

Figure 23:
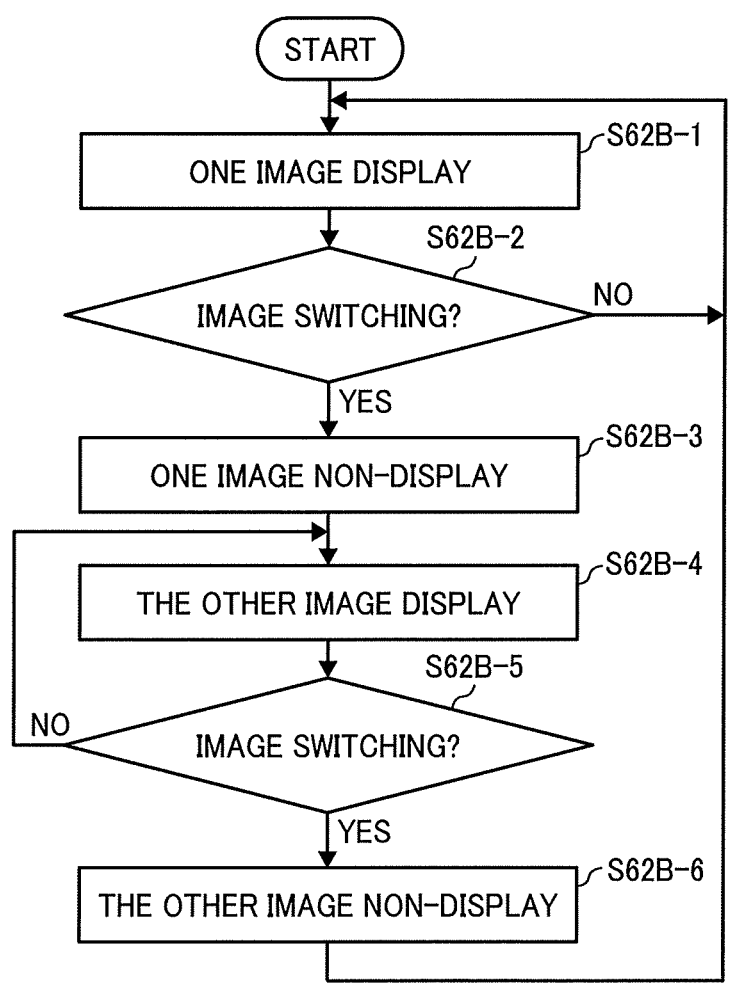
FIG. 23 is a flowchart illustrating a process of controlling to display the image by the communication terminal according to an embodiment of the present invention.

Subsequently, a description will be given of points that are different from the above-described embodiment with respect to the variation B of the embodiment. FIG. 23 is a flowchart showing an example of a process in which the communication terminal 7 controls display of images in variation B. In variation B, the communication terminal 7 adds the following switching processing in the process of displaying the predetermined-area Tc of the image in Step S62 in FIG. 19 or FIG. 22.

Figure 24A:
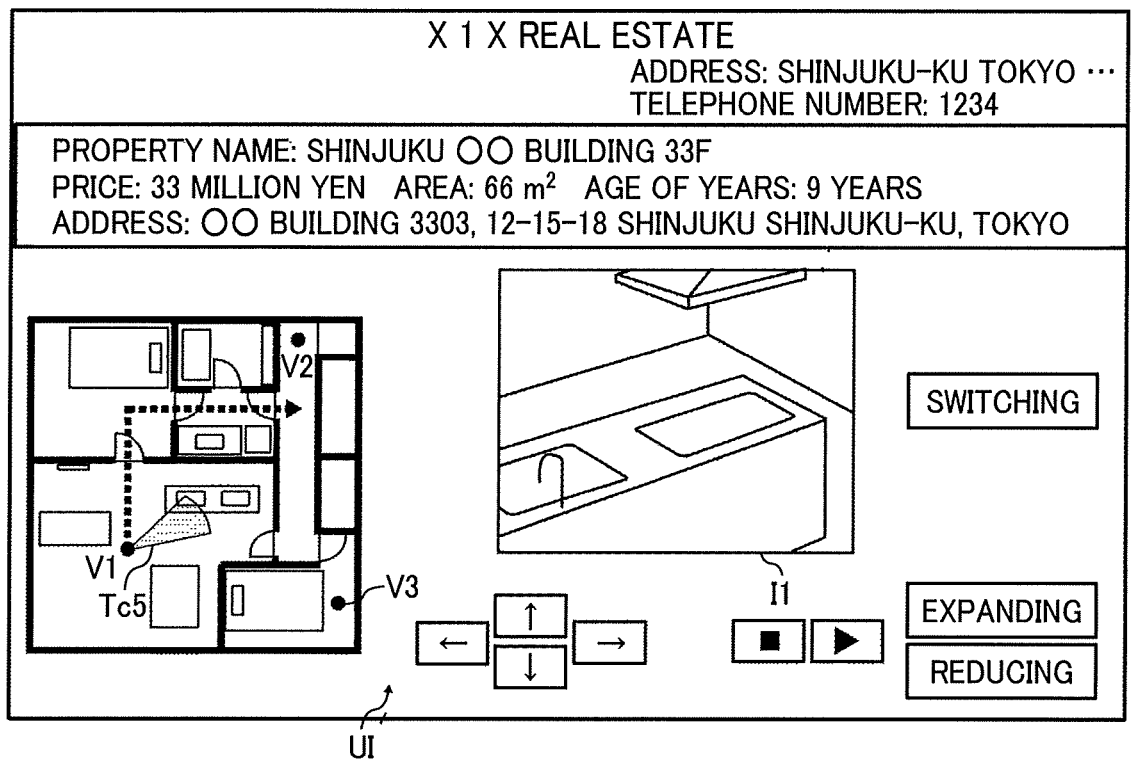
FIGS. 24A and 24B are views illustrating an example of displaying on a display according to an embodiment of the present invention.

First, in the variation B, the display control unit 73 of the communication terminal 7 displays, in an area I1, the predetermined-area Tc related to one predetermined captured image data among a plurality of pieces of captured image data received from the image management system 5 (step S62B-1). One of the images is, for example, the captured image data of the image ID "i11". FIG. 24A is a conceptual diagram showing an example of the screen of the browser in step S62B-1. The direction Tc5 on the sketch diagram of FIG. 24A is the direction of the predetermined-area Tc.

Subsequently, the display control unit 73 of the communication terminal 7 determines whether or not an event for switching images occurs (step S62B-2). The event switching image may be an operation input by the user or a timeout of the timer started by the communication terminal 7. The operation input by the user may be, for example, a selection of a user interface such as a button.

When it is determined in step S62B-2 that no event for switching the image occurs (NO), the display control unit 73 of the communication terminal 7 returns to step S62B-1 and displays predetermined-area Tc related to the one captured image data at a timing to display the next image in the loop process in FIG. 19 or FIG. 22.

In step S62B-2, when it is determined that the event for switching images occurs (YES), the display control unit 73 of the communication terminal 7 controls so that the predetermined-area Tc of the one captured image data is not displayed (Step S62B-3).

Figure 24B:
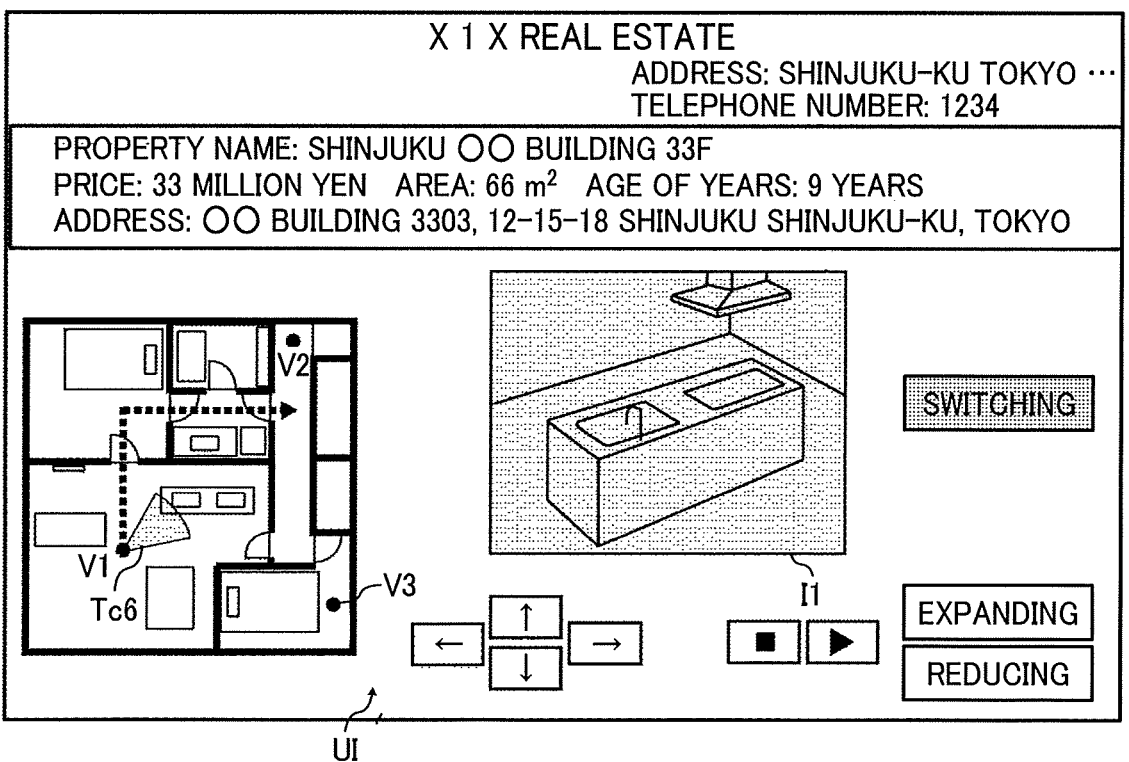

Subsequently, the display control unit 73 of the communication terminal 7 displays, in the area I1 of the screen of the browser, the predetermined-area Tc related to the other captured image data different from the image data among the plurality of captured image data received from the image management system 5 at the timing to display the next image in the loop process in FIG. 19 or FIG. 22 (step S62B-4). The other captured image data is, for example, the captured image data of the image ID "i21". FIG. 24B is a conceptual diagram showing an example of the browser screen in step S62B-4.

The direction Tc6 on the sketch diagram of FIG. 24B is the direction of the predetermined-area Tc. When the process of changing the predetermined-area Tc of step S63 is executed during the display of the one of the image at the previous step S62B-1 and the switching of the display to the other image at the step S62B-4, the changed predetermined-area Tc related to the other captured image data is displayed in the step S62B-4.

Subsequently, the display control unit 73 of the communication terminal 7 determines whether or not the event for switching images occurs as in step S62B-2 (step S62B-5).

In step S62B-5, when it is determined that no event for switching the image occurs (NO), the display control unit 73 of the communication terminal 7 returns to step S62B-4 at the timing to display the next image in the loop process in FIG. 19 or 22, and displays the predetermined-area Tc of the other image.

In step S62B-5 when it is determined that the event for switching images occurs (YES), the display control unit 73 of the communication terminal 7 controls so that the predetermined-area Tc related to the other captured image data is not displayed (Step S62B-6).

Subsequently, the display control unit 73 of the communication terminal 7 returns to the processing of step S62B-1, and display the predetermined-area Tc related to the one of the captured image data is displayed at the timing of displaying the next image in the loop processing of FIG. 19 or 22.

<<<Variation of Embodiment C>>>

Figure 25:
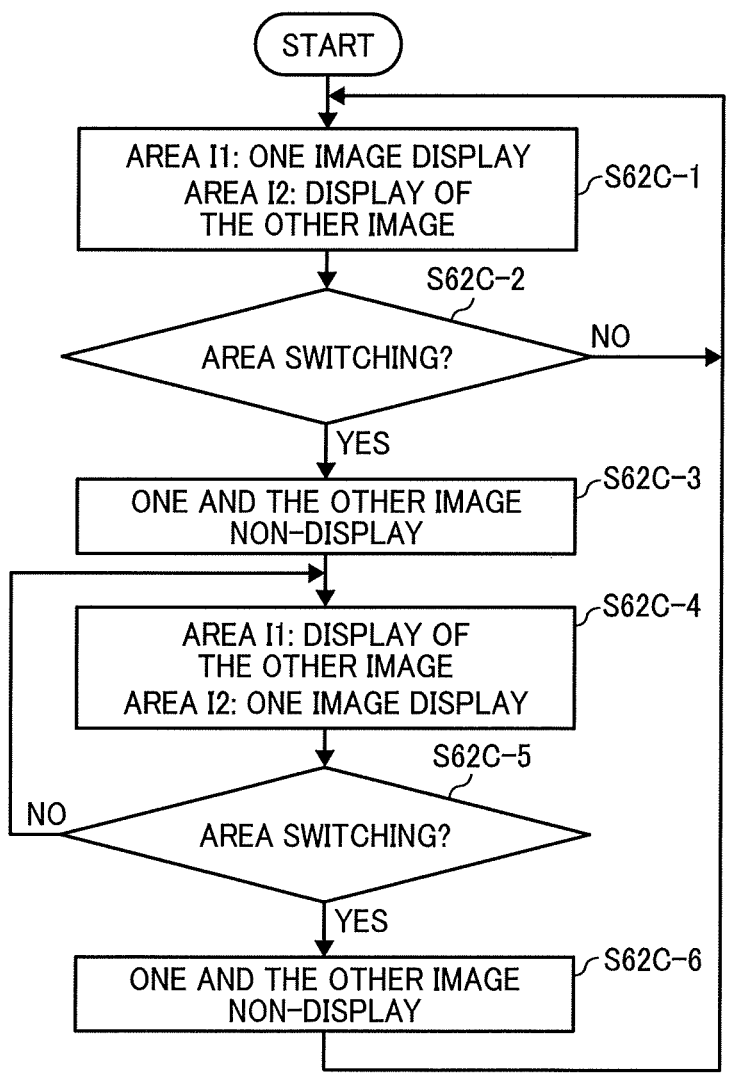
FIG. 25 is a flowchart illustrating a process of controlling to display the image by the communication terminal according to an embodiment of the present invention.

Subsequently, a description will be given of points that are different from variation B of the embodiment with respect to variation C of the embodiment. FIG. 25 is a flowchart showing an example of a process in which the communication terminal 7 controls display of an image in variation C. In variation C, the processing of steps S62B-1 to S62B-6 in variation B is changed as follows.

Figure 26A:
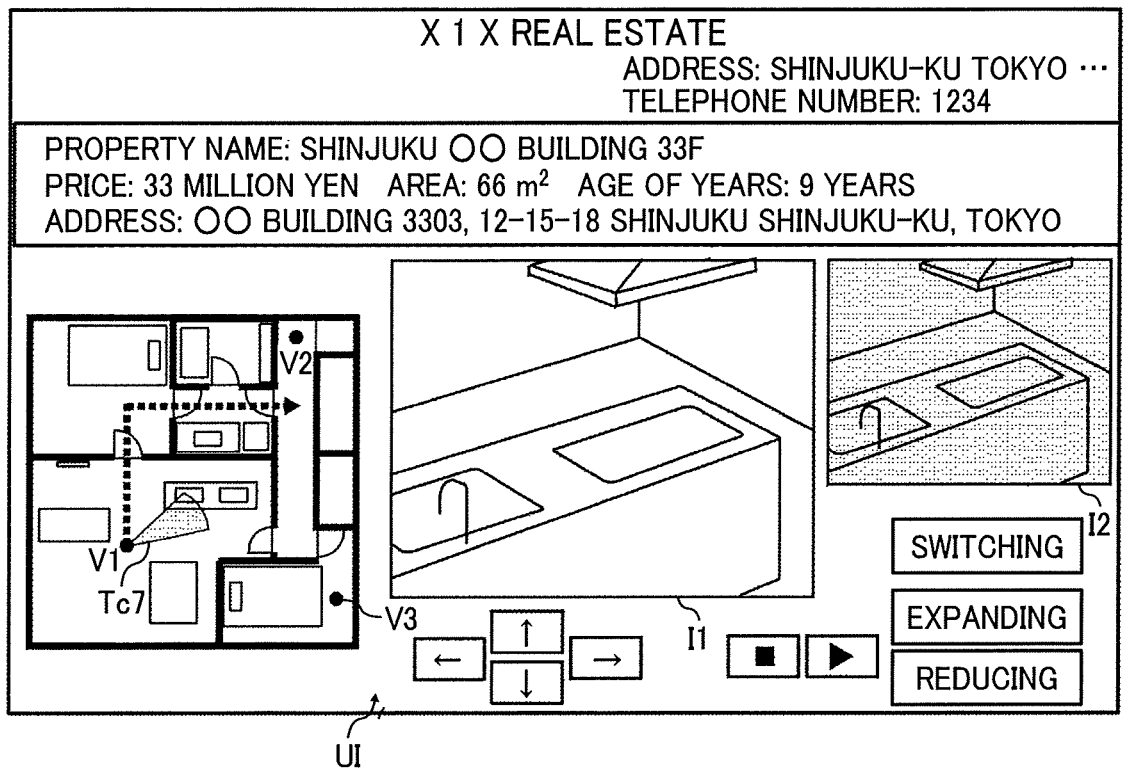
FIGS. 26A and 26B are views illustrating an example of the screen according to an embodiment of the present invention.

The display control unit 73 of the communication terminal 7 displays the predetermined-area Tc related to one predetermined captured image data among the images received from the image management system 5 in the area I1 of the screen of the browser, and displays the predetermined-area Tc related to the another captured image data in the area I2 of the screen of the browser (step S62C-1). FIG. 26A is a conceptual diagram showing an example of the screen of the browser in step S62C-1. The direction Tc 7 on the sketch diagram of FIG. 26A is the direction of the predetermined-area Tc. In FIG. 26A, the one of the captured image data is, for example, the captured image data of the image ID "i11", and the other captured image data is, for example, the captured image data of the image ID "i21". In FIG. 26A, the area I1 is set to a size larger than the area I2.

Subsequently, the display control unit 73 of the communication terminal 7 determines whether or not the event for switching the area occurs (step S62C-2). The event switching event may be an operation input by the user or a timeout of the timer started by the communication terminal 7. The operation input by the user may be, for example, a selection of a user interface such as a button.

In step S62C-2, when it is determined that no event for switching the area occurs (NO), the display control unit 73 of the communication terminal 7 returns to step S62C-1 at the timing to display the next image in the loop process in FIG. 19 or 22, displays the predetermined-area Tc of one of the captured image data in the area I1 and the predetermined-area Tc of the other captured image data in the region I2.

When it is determined in step S62C-2 that an event for switching the area occurs (YES), the display control unit 73 of the communication terminal 7 determines whether or not the predetermined-area Tc related to one captured image data and the other captured image data is (Step S62C-3).

Figure 26B:
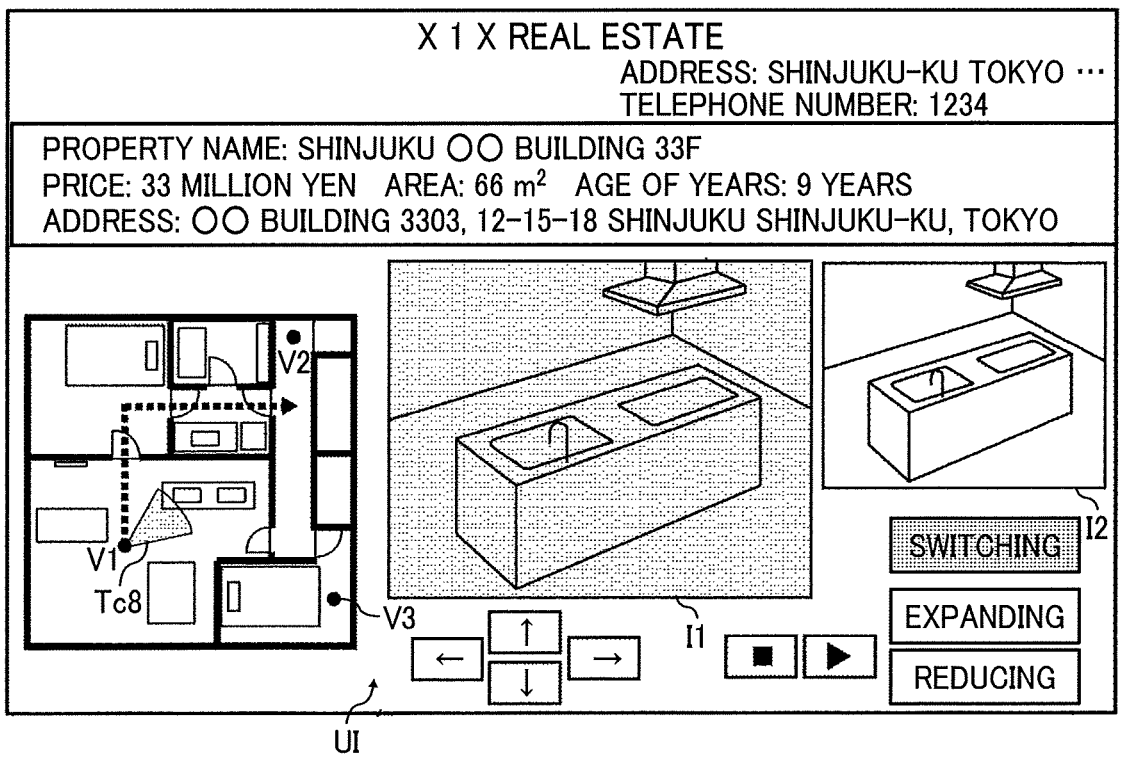

Subsequently, the display control unit 73 of the communication terminal 7 displays, in the area I1, the predetermined-area Tc related to the other captured image data among the images received from the image management system 5 at the timing when the next image is displayed in the loop processing in FIG. 19 or 22, and displays the predetermined-area Tc related to one captured image data in the area I2 (step S62C-4). FIG. 26B is a conceptual diagram showing an example of the screen of the browser in step S62C-4. The direction Tc 8 on the sketch diagram of FIG. 26B is the direction of the predetermined-area Tc. When the process of changing the predetermined-area Tc in step S63 is executed during the period from the display of the image in the preceding step S62C-1 to the switching of the area in step S62C-4, in the step S62C-4, The captured image data and the predetermined-area Tc changed in step S63 related to the other captured image data are displayed.

Subsequently, the display control unit 73 of the communication terminal 7 determines whether or not the event for switching the area occurs as in step S62C-2 (step S62C-5).

In step S62C-5, when it is determined that no event for switching the area occurs (NO), the display control unit 73 of the communication terminal 7 returns to step S62C-4 at the timing to display the next image in the loop processing in FIG. 19 or 22, displays the predetermined-area Tc related to the other captured image data in the area I1, and displays the predetermined-area Tc related to one the captured image data in the area I2.

When it is determined in step S62C-5 that the event for switching the area occurs (YES), the display control unit 73 of the communication terminal 7 controls that the predetermined-area Tc related to one of the captured image data and the captured image data are not displayed (step S62C-6).

Subsequently, the display control unit 73 of the communication terminal 7 returns to the processing of step S62C-1, and the display control unit 73 of the communication terminal 7 displays the predetermined-area Tc in the area I1 at the timing of displaying the next image in the loop processing in FIG. 19 or FIG. 22, and displays the predetermined-area Tc related to the other captured image data in the region I2.

<<<Variation of Embodiment D>>>

Figure 27:
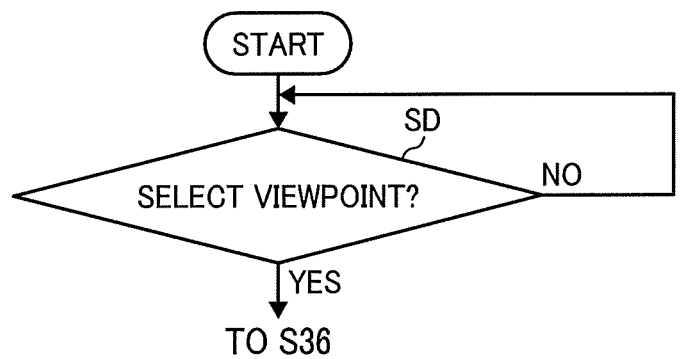
FIG. 27 is a flowchart illustrating a process of controlling to display the image by the communication terminal according to an embodiment of the present invention.

Subsequently, a description will be given of points that are different from the above embodiment with respect to the variation D of the embodiment. FIG. 27 is a flowchart showing an example of a process in which the communication terminal 7 controls the display of images in variation D. In variation D, the communication terminal 7 processes in parallel with the processing in FIG. 19 or FIG. 22 as follows.

After starting the loop processing in FIG. 19 or FIG. 22, the accepting unit 72 of the communication terminal 7 accepts selection of a viewpoint (V2 or V3) different from the viewpoint V1 of the currently displayed image. As another viewpoint, for example, when the viewpoint V2 is selected (YES in step SD), the process according to the script for acquiring the captured image data of the viewpoint V 2 is started. In this process, the transmitting/receiving unit 71 of the communication terminal 7 returns to step S36 and transmits a request for captured image data of the viewpoint V2 of the property "A" to the image management system 5 (step S36). The request of the captured image data includes each URL of captured image data of a plurality of viewpoints V2.

Hereinafter, by the same processing as in the above embodiment, the communication terminal 7 acquires the plurality of captured image data of the viewpoint V 2 of the property "A", synchronizes the predetermined area (Tc–T0), and then transmits the captured image data to the plurality of captured image data And displays the predetermined-area Tc.

<<<Variation of Embodiment E>>>

Subsequently, a description will be given of points that are different from the variation C of the embodiment with respect to the variation E of the embodiment. In the variation C of the embodiment, the communication terminal 7 is a smartphone.

In step S25, the page generating unit 52 of the image management system 5 generates a web page of the property "A" for a browser operating on the communication terminal such as a smartphone, separately from a web page of the property "A" for the browser operating on the communication terminal such as a PC. In this case, the page generating unit 52 generates the WEB page of the property "A" so that the area I2 and the sketch "P" of the property "A" are superimposed and displayed on the area I1.

When the transmitting/receiving unit 51 of the image management system 5 receives a request to acquire the WEB page of the property "A" from the browser of a terminal such as the smartphone in step S32, the storing/reading unit 59 reads the Web page for the browser of the terminal such as the smartphone among the WEB page of the property "A" from the storage unit 5000 in step S33.

The transmitting/receiving unit 51 of the image management system 5 transmits the WEB page of the property "A" for the browser of the terminal such as the smartphone read in step S 33 to the communication terminal 7 (step S34). The subsequent processing is the same as the variation C of the embodiment.

Figure 28A:
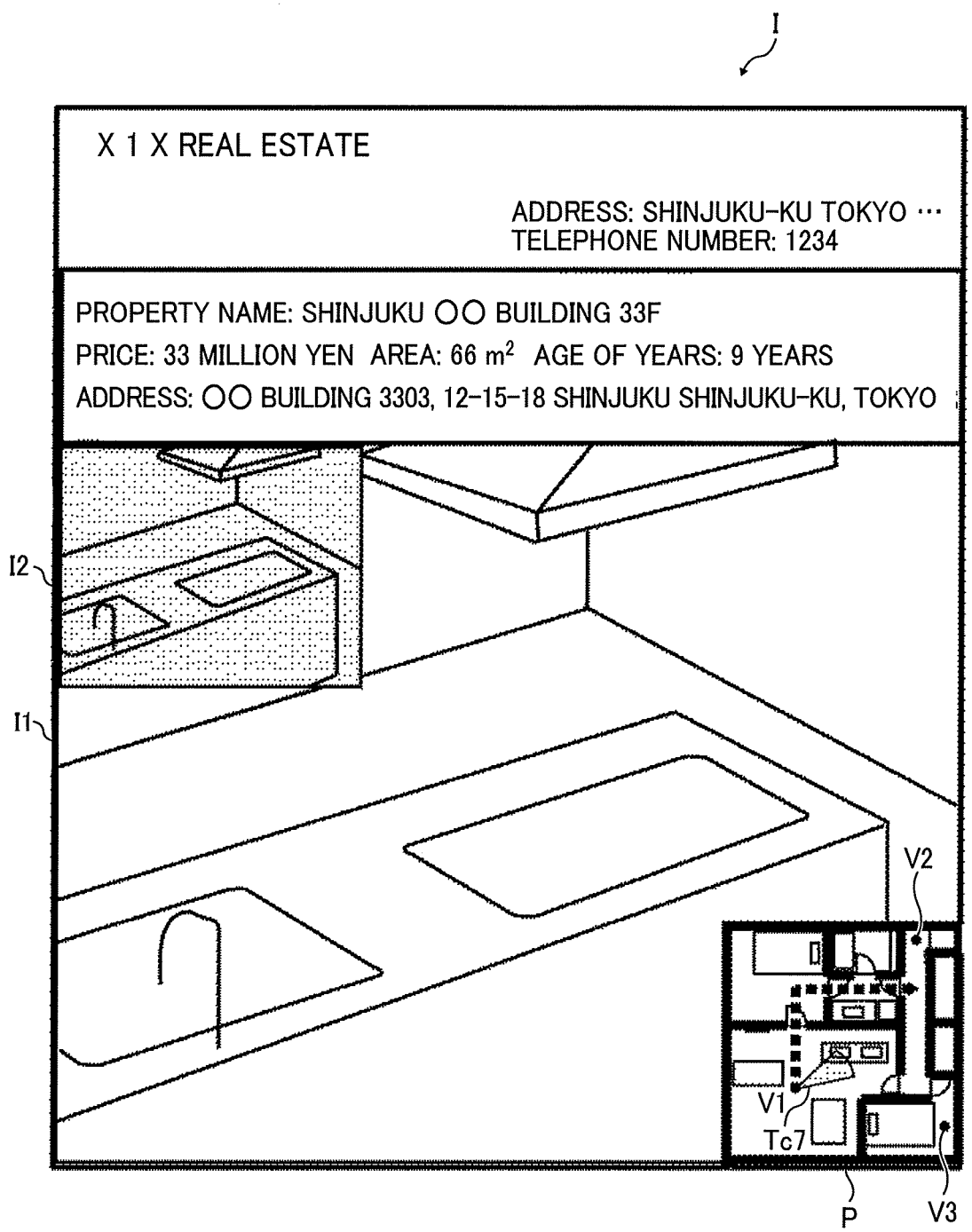
FIGS. 28A and 28B are views illustrating an example of the screen according to an embodiment of the present invention.
Figure 28B:
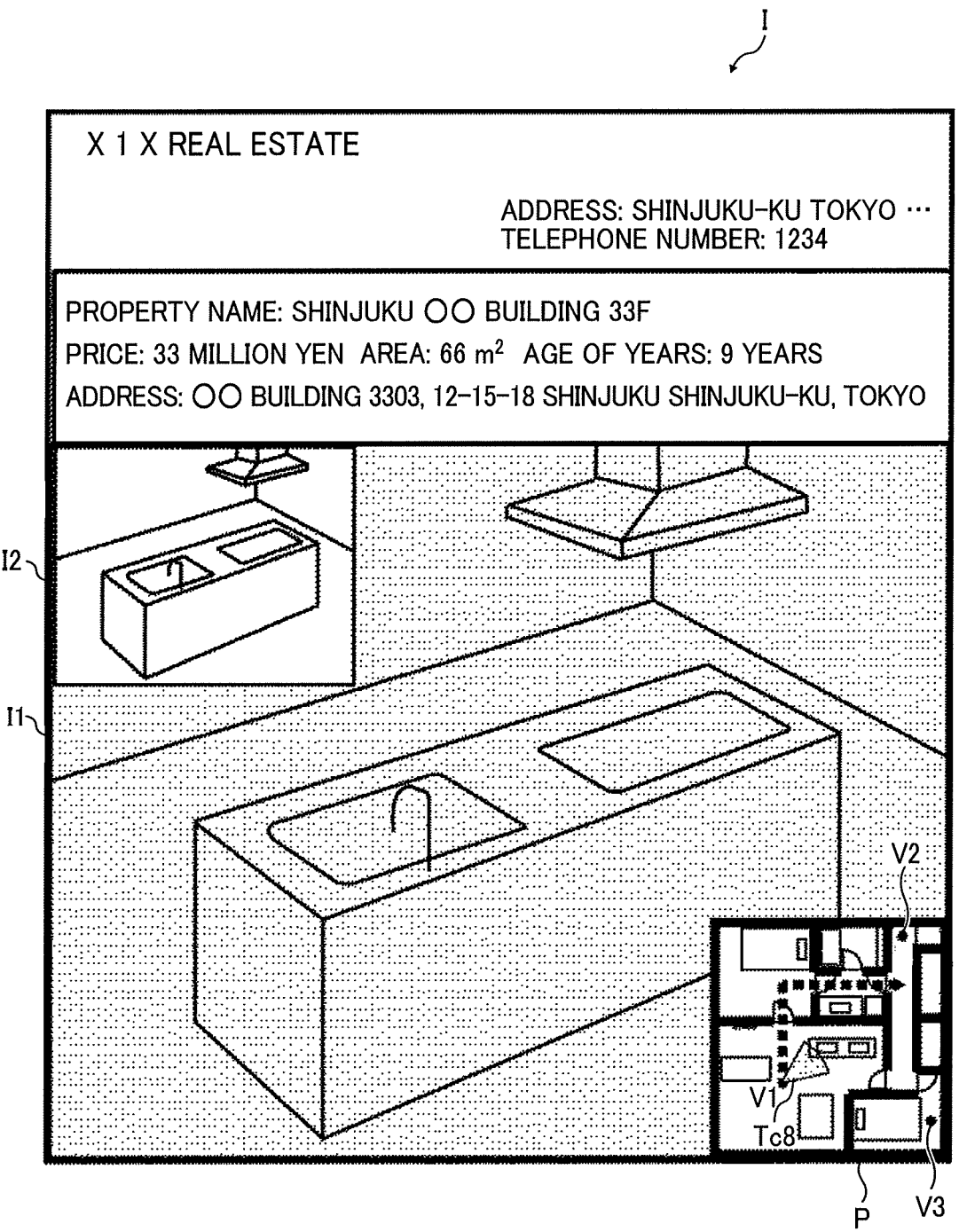

FIG. 28A is a conceptual diagram showing an example of the screen of the browser in step S62C-1. FIG. 28B is a conceptual diagram showing an example of the browser screen in step S62C-4. In these steps, the display control unit 73 of the communication terminal 7 performs control such that the area I2 and the sketch "P" of the property "A" are superimposed on the area I1 and displayed in accordance with the WEB page of the property "A" for the browser of the terminal such as a smartphone.

<<Supplement to Embodiment>>

The image acquired and displayed by the communication terminal 7 is not limited to the full spherical panoramic image but may be any panoramic image. When the above image is an all-sky panoramic image captured at 360° or a panoramic image taken at 180°, the coordinates can be set by dividing the image by latitude or longitude, so that the relative position of the predetermined-area Tc with respect to the predetermined-area T0 can be easily calculated. The term "all-sky" or "all-sky panoramic image" means an image which has been captured so that all 360 degrees can be displayed (e.g., a spherical image). This includes images captured by the Ricoh Theta camera. When another panoramic image is used, it is preferable that the communication terminal 7 acquires the angle of view of the imaging range for each of the plurality of panoramic images. Thereby, the communication terminal 7 sets the coordinates (rH, rV) to represent the panoramic image by longitude and latitude, for each of the plurality of images, and can be calculated the relative position of the predetermined-area Tc with respect to the predetermined-area T0.

The accepting unit 72 of the communication terminal 7 may accept the start and stop of synchronization of the predetermined area (Tc–T0) in the plurality of all-sky panoramic images. When the reception unit 72 accepts the start of the synchronization, the communication terminal 7 synchronizes the predetermined-area (Tc–T0) in the plurality of all-sky panoramic images by the loop processing of FIG. 19 and FIG. 22. Further, in step S63 of FIG. 19 and FIG. 22, when the reception unit 72 accepts the stop of the synchronization, the communication terminal 7 changes the predetermined-area Tc of one of the plurality of all-sky panoramic images instead of changing both of the predetermined areas Tc of the plurality of all-sky panoramic images, even if new captured image data is received, the communication terminal 7 does not execute the process of the synchronization of the predetermined-area (TC–T0) in step of S67.

In the above embodiment, the communication terminal 7 has synchronized the predetermined area (Tc–T0) in the two whole spherical panoramic images, but it is also possible that the communication terminal 7 synchronizes the predetermined area (Tc–T0) in the three or more whole spherical panoramic images may be synchronized similarly to the processing according to the above embodiment. In this case, the display control unit 73 of the communication terminal 7 may display the predetermined-area Tc in the arbitrary number of all-sky panoramic images of one or more of the three or more full-spheres panoramic images.

<<Main Effect of the Present Embodiment>>

In the image display method of the above embodiment (an example of the synchronization process), the image management unit 74 (an example of the synchronization unit) of the communication terminal 7 (an example of the image display system) synchronizes the relative position of the current predetermined-area Tc (an example of the first area) with respect to the predetermined-area T0 (an example of the predetermined area) which is the reference related to the first captured image data (an example of the first panoramic image) and the relative position of the current predetermined-area Tc (an example of a second area) with respect to the predetermined-area T0 (an example of a predetermined area) which is the reference related to the second captured image data (an example of the second panoramic image). The display control unit 73 (an example of the display control unit) of the communication terminal 7 displays at least one of the present predetermined-area Tc related to the first captured image data and the current predetermined-area Tc related to the second captured image data (an example of a display control process). The image management unit 74 of the communication terminal 7 changes the other predetermined-area Tc according to the change of the present predetermined-area Tc related to the first captured image data or according to the change of the current predetermined-area Tc related to the second captured image data change. According to the communication terminal 7, even if the area to be displayed is changed in the plurality of panorama images captured at the same position, the same object is displayed.

The image management unit 74 (an example of a stopping unit) stops the change of the predetermined-area Tc related to the first captured image data by the process of step SA3 until the second captured image data is displayed after the first captured image data is displayed by the display control unit 73 of the communication terminal 7. Thereby, the communication terminal 7 can synchronize the predetermined-area Tc when display of a plurality of captured image data starts.

The first captured image data and the second captured image data are moving images, and the image management unit 74 of the communication terminal 7 synchronizes the reproduction time related to the first captured image data and the reproduction time related to the second captured image data. For example, when the first captured image data and the second captured image data are moving images captured while moving the same flow line at the same speed, the communication terminal 7 synchronously displays the predetermined-area Tc related to the plurality of the captured image data at the arbitrary viewpoint on the flow line.

The communication terminal 7 moves, rotates, enlarges, or shrinks the other predetermined-area Tc in accordance with the he movement, rotation, enlargement, or reduction of the predetermined-area Tc related to the first captured image data or the predetermined-area Tc related to the second captured image data. As a result, the communication terminal 7 can synchronize the predetermined-area Tc of the plurality of captured image data at the time of moving, rotating, enlarging, or shrinking the predetermined-area Tc of the plurality of captured image data.

The display control unit 73 of the communication terminal 7 switches the display of the predetermined-area Tc related to the first captured image data and the display of the predetermined-area Tc related to the second captured image data. As a result, even when the screen of the display 508 is small, the communication terminal 7 can display the plurality of captured image data by switching the plurality of captured image data.

The display control unit 73 of the communication terminal 7 switches the display position of the predetermined-area Tc related to the first captured image data and the display position of the predetermined-area Tc related to the second captured image data. At this time, for example, by enlarging the size of one display position, the communication terminal 7 can emphasize the display of one captured image data among the plurality of captured image data.

The accepting unit 72 (an example of an accepting unit) of the communication terminal 7 accepts the start of synchronization.

In response to reception of the start of synchronization by the reception unit 72, the image management unit 74 of the communication terminal 7 synchronizes the predetermined area (Tc–T0) relating to the first captured image data and the predetermined area (Tc–T0) relating to the second captured image data. In response to changing the predetermined area Tc relating to the first captured image data or the predetermined area Tc relating to the second captured image data, the image management unit 74 of the communication terminal 7 changes the other area. As a result, the communication terminal 7 can switch whether to change the predetermined-area Tc related to the plurality of captured image data independently or synchronously.

The image management system 5 of the image communication system transmits a script for acquiring the first captured image data and the second captured image data to the communication terminal 7. Thereby, the communication terminal 7 can acquire a plurality of captured image data from the image management system 5.

What is claimed is:

1. An image display system comprising:
   a display; and
   a processor configured to:
   synchronize a first relative position of a first area in an area of a first panorama image and a second relative position of a second area in an area of a second panorama image, each of the first panorama image and the second panorama image being a spherical panoramic image and each of the first area and the second area is displayed based on an angle of view for the respective panorama image;
   display at least the first area in the first panorama image and at least the second area in the second panorama image as separate images on a screen surface of the display; and
   change the first area displayed in response to a change of the second area.

2. The image display system of claim 1, wherein the processor is further configured to:
   stop changing the first area until displaying the second panorama image after displaying the first panorama image.

3. The image display system of claim 1, wherein:
   the first panorama image and the second panorama image are movie images, and the processor is further configured to:
synchronize a reproduction time of the first panorama image and a reproduction time of the second panorama image.

4. The image display system of claim 1, wherein the processor is further configured to:
rotate the first area in response to rotating the second area, move the first area in response to moving the second area, enlarge the first area in response to enlarging the second area, and shrink the first area in response to shrinking the second area.

5. The image display system of claim 1, wherein the processor is further configured to:
switch displaying the first area in the first panorama image and display the second area in the second panorama image.

6. The image display system of claim 1, wherein the processor is further configured to:
switch a display position of the first area in the first panorama image and a display position of the second area in the second panorama image.

7. The image display system of claim 1, wherein the processor is further configured to:
accept a start of the synchronization;
synchronize the first relative position of the first area and the second relative position of the second area in response to accepting the start of the synchronization; and
change the first area in response to changing the first area.

8. A communication system, comprising:
the image display system of claim 1; and
an image management system comprising a processor configured to transmit a script for acquiring the second panorama image and the first panorama image to the image display system.

9. A computer implemented method for image displaying, comprising:
synchronizing a first relative position of a first area in an area of a first panorama image and a second relative position of a second area in an area of a second panorama image, each of the first panorama image and the second panorama image being a spherical panoramic image and each of the first area and the second area is displayed based on an angle of view for the respective panorama image;
displaying at least the first area in the first panorama image and at least the second area in the second panorama image as separate images on a screen surface of a display; and
changing the first area displayed which is displayed in response to a change of the second area in response to a change of the second area.

10. The method of claim 9, further comprising:
stopping changing the first area until displaying the second panorama image after displaying the first panorama image.

11. The method of claim 9, wherein:
the first panorama image and the second panorama image are movie images, and
the method further comprises:
synchronizing a reproduction time of the first panorama image and a reproduction time of the second panorama image.

12. The method of claim 9, further comprising:
rotating the first area in response to rotating the second area, moving the first area in response to moving the second area, enlarging the first area in response to enlarging the second area, and shrinking the first area in response to shrinking the second area.

13. The method of claim 9, further comprising:
switching displaying the first area in the first panorama image and display the second area in the second panorama image.

14. The method of claim 9, further comprising:
switching a display position of the first area in the first panorama image and a display position of the second area in the second panorama image.

15. The method of claim 9, further comprising:
accepting a start of the synchronization;
synchronizing the first relative position of the first area and the second relative position of the second area in response to accepting the start of the synchronization; and
changing the first area in response to changing the first area.

16. The image display system of claim 1, where the angle of view that forms the basis of the predetermined area of each of the first area and the second area originates at the center of a virtual sphere, and the first panorama image and the second panorama image are configured to be displayed in a manner in which the angle of view can be altered within each respective panorama image in response to a user input to change what portion of the panorama image is displayed in the first area and second area.

* * * * *